(12) United States Patent
Yacobi et al.

(10) Patent No.: US 7,020,638 B1
(45) Date of Patent: Mar. 28, 2006

(54) SYSTEM AND METHOD FOR FLEXIBLE MICROPAYMENT OF LOW VALUE ELECTRONIC ASSETS

(75) Inventors: Yacov Yacobi, Mercer Island, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/451,254

(22) Filed: Nov. 29, 1999

Related U.S. Application Data

(63) Continuation-in-part of application No. 09/251,229, filed on Feb. 16, 1999, now abandoned, which is a continuation of application No. 08/751,311, filed on Nov. 18, 1996, now Pat. No. 5,872,844.

(51) Int. Cl.
*G06F 17/60* (2006.01)

(52) U.S. Cl. .............................. 705/69; 705/69; 705/76; 705/39; 705/42; 380/30; 380/225

(58) Field of Classification Search .................. 705/69, 705/1, 76, 39, 42; 380/30, 225
See application file for complete search history.

(56) References Cited

U.S. PATENT DOCUMENTS

| | | | | |
|---|---|---|---|---|
| 5,231,666 A | * | 7/1993 | Matyas | 705/66 |
| 5,511,121 A | * | 4/1996 | Yacobi | 380/30 |
| 5,872,844 A | | 2/1999 | Yacobi | 380/24 |
| 5,878,138 A | * | 3/1999 | Yacobi | 340/5.41 |
| 5,878,140 A | * | 3/1999 | Chaum | 380/30 |
| 5,905,976 A | * | 5/1999 | Mjolsnes et al. | 705/39 |
| 5,952,638 A | * | 9/1999 | Demers et al. | 235/379 |
| 6,021,399 A | * | 2/2000 | Demers et al. | 235/379 |
| 6,341,273 B1 | * | 1/2002 | Briscoe | 705/39 |

FOREIGN PATENT DOCUMENTS

| | | |
|---|---|---|
| EP | 0 865 010 | 9/1998 |
| WO | 98/43211 | 10/1998 |
| WO | WO 200144968 A * | 11/2000 |

OTHER PUBLICATIONS

Schneier, Bruce Applied cryptography, 1996 John Wiley and sons; p. 51.*

* cited by examiner

*Primary Examiner*—John W. Hayes
*Assistant Examiner*—John M Winter
(74) *Attorney, Agent, or Firm*—Lee & Hayes PLLC

(57) ABSTRACT

An electronic asset system mints a stick of electronic assets that can be spent by the user with multiple vendors. Assets sticks are issued anonymously or non-anonymously in a way without requiring dedication to a particular vendor, hence allowing the user to spend one or more assets from the stick with different vendors. The auditor randomly audit samples of the spent assets to detect whether the assets have been fraudulently used. The electronic asset system employs tamper-resistant electronic wallets constructed as dedicated hardware devices, or as devices with secure-processor architecture. The electronic asset system also facilitates handling of electronic coupons in a manner that enforces compliance between the user and the vendor. The user and vendor each maintain a stick of corresponding coupons with pointers to the most recent and oldest coupons available for expenditure. When a coupon is used or granted, the user and vendor both update the appropriate pointer to their respective sticks and then exchange signed data describing placement of the pointer to verify a correspondence between the referenced coupons.

39 Claims, 10 Drawing Sheets

SYSTEM AND METHOD FOR FLEXIBLE MICROPAYMENT OF LOW VALUE ELECTRONIC ASSETS

RELATED APPLICATIONS

This is a continuation-in-part of U.S. patent application Ser. No. 09/251,229, filed Feb. 16, 1999 now abandoned, which is a continuation of U.S. patent application Ser. No. 08/751,311, filed Nov. 18, 1996, which issued as U.S. Pat. No. 5,872,844 on Feb. 16, 1999.

TECHNICAL FIELD

This invention relates to systems that exchange electronic assets as representations of value. More particularly, the invention relates to systems and methods for paying small sums of electronic assets in a flexible and efficient manner. This invention further relates to techniques for handling coupon-based assets.

BACKGROUND

Electronic assets are digital representations of value. Electronic assets might be used to represent cash, coins, tokens, coupons, entertainment tickets, government entitlement provisions, and so on. Electronic assets are long, mostly random binary strings, with some relatively small recognizable pattern that are signed by an issuer. For instance, an electronic asset might consist of 500 bits in which 400 bits are truly random, 50 bits are an identifiable string (e.g., all binary zeroes), and the remaining 50 bits are an expiration date. The binary strings are typically generated by an institution that issues the electronic assets. Banks, ticket companies, federal or local government, and businesses are all possible issuers of different kinds of electronic assets.

Once issued, the electronic assets are stored in an electronic storage facility, often referred to as an "electronic wallet", which may be portable or stationary. Electronic wallets are tamper-resistant storage devices that make it difficult to commit fraud. The size of the electronic wallet depends upon the kind and amount of assets to be stored thereon.

Driven by technological advances, there is an increasing desire to conduct more commerce electronically, thereby replacing traditional asset forms (bills, coins, paper coupons, tickets, etc.) with electronic assets that represent them. A large segment of commerce is found at the low end of the value scale. This commerce involves values equivalent to present day coins (i.e., pennies, nickels, dimes, quarters, half-dollars, and dollars) and even smaller monetary units less than one cent.

Handling low value electronic assets poses some challenges. Ideally, issuing electronic assets and subsequently spending them would be as flexible as traditional paper bills and metal coins. Unfortunately, electronic assets can be easily and rapidly replicated using computers. This presents a significant risk of fraud. Criminals can reproduce the bit string of an asset and pass off the forged or counterfeited electronic assets as real. To the recipient, the counterfeit bit string offered by the criminal is identical to the expected asset bit string, rendering it difficult to detect whether the offered bit string is the original asset or a reproduced asset that has been "spent" many times before (unless multispending is done to the same payee).

To reduce the risk of fraud, limitations and restrictions are placed on how electronic assets are issued, spent, and deposited. One prior art technique, known as "Payword", is a micropayment scheme that amortizes the processing cost of one traditional electronic coin over a whole (arbitrarily large) batch of coins (called a "stick"). Each coin in the stick has the same value. Payword, developed by Rivest and Shamir, is limited however in that the entire stick of coins must be dedicated ahead of time to a single vendor.

FIG. 1 shows three participants in an electronic asset system 20 implemented according to the Payword protocol: a user U, a bank B, and a vendor V. To briefly describe Payword, let the function $S_i(m)$, $i\in\{U,B,V\}$, denote a signature of party i on message m, wherein the signature has message recovery built in. In a "Withdrawal" exchange between the bank B and the user U, the user U asks the bank B to mint L coins, dedicated to vendor V. Individual coins are derived using a random value x and a one-way hashing function h( ) as follows:

$$\text{Coin } 1 = h(x)$$

$$\text{Coin } 2 = h(h(x))$$

$$\text{Coin } 3 = h(h(h(x)))$$

$$\vdots$$

$$\text{Coin } L = h^L(x)$$

To compute a stick of coins, the bank picks the random x and computes a stick of L coins, as follows:

$$y = h^L(x)$$

The value y represents the bottom coin on the stick. After creating the stick of coins, the bank dedicates the stick to a single vendor and signs the stick. The bank creates a value z that contains the user's identity U, the value y, the dedicated vendor's identity V, denomination d, the number of coins in the stick L and an expiration time t at which coins will expire (i.e., $z=(U,y,V,d,L,t)$). The bank B signs the value z, $S_B(z)$, and returns the random x and signed stick $S_B(z)$ to the user U.

When the user pays coins to the dedicated vendor (i.e., the "Payment" exchange between the user and the vendor), the user first sends the signed stick $S_B(z)$ to the vendor. The vendor authenticates the signature. The user sends over individual coins by moving up the stick starting from the bottom stick value y. Individual coins are derived using the hashing function h( ). In this matter, the computational process of spending one or more coins from the stick is very efficient and requires little processing resources on both sides. The top coin in the stick is the random value x.

At the end of the day, the vendor deposits the highest (latest) coin received from the user (i.e., the "Deposit" exchange from the vendor to the bank). The bank credits the vendor for the stick fraction that is deposited. The user maintains credit for the remaining portion of the stick and can continue to spend it later.

Since the hashing function h( ) is one-way, the vendor cannot cheat by exceeding the highest received coin. In addition, the user cannot double spend because the stick is dedicated to one specific vendor, who is capable of rejecting double spending. The cost of a batch minting is roughly the cost of one traditional coin mint, since hashing is four orders of magnitude faster than signing. Likewise, the cost of batch deposit is roughly the cost of one traditional deposit.

Payword is limited, however, in that the stick can only be used to pay a single vendor without increased risk of fraud. This is because a vendor can easily check previous coin receipts to see if the user is trying to reveal a coin that the vendor has already seen, but multiple vendors have no easy way of comparing notes on what coins have been revealed. Thus, while Payword is efficient in terms of minting and spending coins, it is inflexible because the user is not free to spend coins coming from one stick with multiple vendors.

Accordingly, there is a need to design a system that is efficient like Payword, but is also flexible in allowing the user to spend the coins coming from one stick with multiple vendors.

SUMMARY

This invention concerns an electronic asset system and process that captures the efficiency of asset sticks while allowing the flexibility to spend coins from the same stick with multiple vendors. The system is sound, in that the cost to break the system exceeds the maximal possible theft due to the break.

The electronic asset system includes a bank B (or other type of issuer), a user U, and multiple vendors V1, V2, . . . VM. The system may also include an auditor A, although the bank/issuer may perform the auditing functions. The process has four phases: withdrawal, payment, deposit, and audit.

During the withdrawal phase, a user creates a stick of L electronic assets by computing:

$$C_i = h^i(x) \text{ (for } i=1, \ldots, L)$$

where h(x) is a hashing function of a value x. The user then forms a withdrawal request having a user identity U, a user secret K, the bottom asset $C_L$ taken from a bottom of the stick, a denomination d indicating a value for the assets in the stick, an expiration t, and the length L (i.e., number of assets in the stick). The user submits the withdrawal request to the bank, which signs the withdrawal request:

$$S_B(U, K, d, C_L, t, L)$$

The bank returns the bank-signed withdrawal request to the user. The resulting stick and signed withdrawal request are not dependent on, nor limited to any vendor. Accordingly, the user is free to spend assets from the stick with different vendors.

During the payment phases, the user decides to spend one or more assets from the stick with a vendor having an identity V. The user forms a payment request by concatenating the vendor identity V, a first asset Cj to be spent from the stick, a depth D indicating a distance of the first asset from the bottom of the stick, and a nonce (i.e., a random value generated by the user for inclusion in the payment request). The user signs the payment request:

$$S_U(Cj, D, V1, \text{nonce})$$

The user submits the signed payment request along with the bank-signed withdrawal request to the vendor. The vendor evaluates the signatures of the bank and user and ensures that the coin is properly contained within the stick. If all tests pass, the vendor accepts the first asset as payment. Subsequent to this first asset, the user can pass any additional assets from the stick as payment without digitally signing them.

During the deposit phase, the vendor periodically creates a deposit request having the user-signed first asset $S_U(Cj)$, a last asset spent from the stick Ck, and a run length RL of assets beginning with the first asset Cj and ending with the last asset Ck. The vendor signs the deposit request:

$$_V(S_U(Cj), Ck, RL)$$

The vendor submits the vendor-signed deposit request along with the bank-signed withdrawal request to the bank. The bank evaluates the vendor signature, the user signature, and its own signature. The bank ensures that the assets are from the stick and credits the vendor's account with the run of assets.

During the audit phase, the vendor wallet randomly selects samples of the assets spent by the user and submits the samples to the auditor. The auditor checks whether the assets have been used in a fraudulent manner (i.e. double spent coins). If so, the user identity is revoked. The auditor also employs a deterministic audit that evaluates all spent assets deposited with the bank for purposes of uncovering fraud.

The electronic asset system employs tamper-resistant electronic wallets embodied in a number of different ways, including smart cards, handheld computing devices, and computers. The wallets are constructed as dedicated hardware devices or as devices with secure-processor architecture. The breaking cost of such wallets is higher than the amortized cost of printing or minting false conventional cash.

The electronic asset system is also capable of handling a special class of assets, namely, electronic coupons. The user and vendor each maintain a stick of corresponding coupons with pointers to the most recent and oldest coupons available for expenditure. When a coupon is used or granted, the user and vendor both update the appropriate pointer to their respective sticks and then exchange signed data describing placement of the pointer to verify a correspondence between the referenced coupons.

DETAILED DESCRIPTION

The following discussion assumes that the reader is familiar with electronic assets (or "electronic coins" or "digital cash") and cryptography. For a basic introduction of digital cash and cryptography, the reader is directed to a text written by Menezes, van Oorschot, Vanstone entitled "Handbook of Applied Cryptography", published by CRC Press, 1977, ISBN 0-8493-8523-7. Another useful text is written by Bruce Schneier and entitled "Applied Cryptography: Protocols, Algorithms, and Source Code in C," published by John Wiley & Sons with copyright 1994 (revised edition in 1996).

Figure 1:
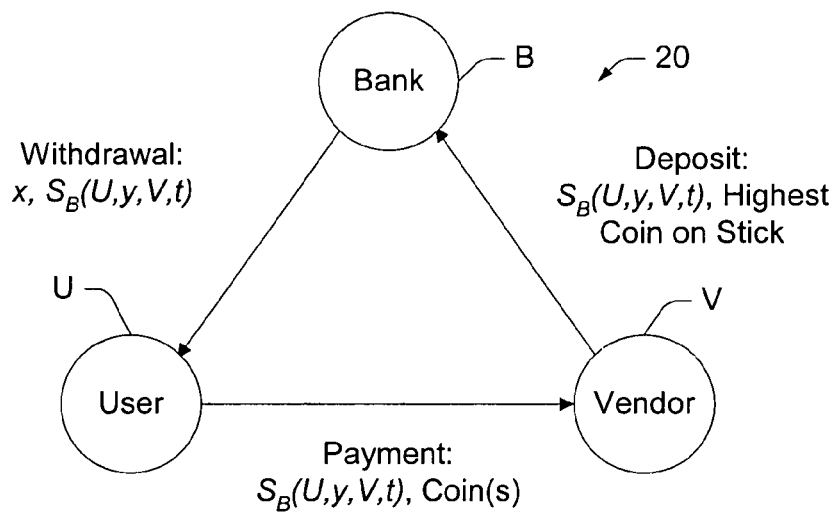
FIG. 1 is a general diagrammatic illustration of an electronic asset system that is implemented using a prior art process for minting coins known as "Payword".

FIG. 1 generally shows an electronic asset system 30 in which electronic assets are issued, spent, deposited, audited, and ultimately expired. As used in this disclosure, the term "electronic asset" means an electronic representation of value, typically expressed in binary bits. It might include tickets, tokens, cash, coins, government entitlements, coupons, or the like. For discussion purposes, aspects of this invention are described in the context of "electronic coins" that are minted in a "stick" of numerous coins. Other aspects of this invention are described in the context of "electronic coupons". However, these specific implementations may be generalized to other types of assets.

Assets are stored on tamper-resistant electronic wallets. Tamper-resistant technology makes it difficult to directly open the wallet's memory and obtain the stored assets, or to communicate with the wallet other than as specified by certain cryptographic protocol, which also protects the communication channel. To break such tamper-resistant wallets, the criminal is anticipated to make an initial investment to defeat the tamper-resistant protection. There are many different ways to implement tamper-resistant wallets. They may be implemented as small portable computing devices with their own trusted displays and keyboards, such as hand held computers, personal digital assistants, or laptop computers. A less sophisticated electronic wallet may be implemented as a smart card, PC card, or other technology, which permit receipt, storage, and output of electronic assets. Specific implementations of a hard-to-break wallet are described under the heading "Computers/Wallets".

The assets may be transferable or non-transferable. A "transferable electronic asset" is an electronic asset that may be transferred multiple times, similar to real cash. A system using transferable electronic assets is described in U.S. Pat. No. 5,872,844, entitled "System and Method of Detecting Fraudulent Expenditure of Transferable Electronic Assets", which issued Feb. 16, 1999, in the name of Yacov Yacobi. This patent is owned by Microsoft Corporation and is hereby incorporated by reference.

A "non-transferable electronic asset" is an electronic asset that is uniquely issued for a single use and then retired from circulation after the one use. Unlike traditional cash, non-transferable electronic assets are not reused numerous times. A system using non-transferable electronic assets is described in U.S. Pat. No. 5,878,138, entitled "System and Method for Detecting Fraudulent Expenditure of Electronic Assets", which issued Feb. 12, 1999, in the name of Yacov Yacobi. Microsoft Corporation owns this patent.

The electronic asset system 30 includes a bank B, a user U, and multiple vendors V1, V2, . . . , VM. The system 30 may also include an auditor A, although the bank may also perform the auditing functions. Generally, the system implements four phases: withdrawal, payment, deposit, and audit. The user withdraws electronic assets from the bank as represented by the "Withdrawal" branch 32. The user then spends the assets through payments to the different vendors V1, V2, . . . , VM, as represented by the "Payment" branch 34. Periodically, the vendors deposit the collected assets with the bank, as represented by the "Deposit" branch 36. In this most basic model, the bank performs both the issuing function and the collection function, although the two functions can be performed by separate banks, which then have to consolidate.

The vendor periodically submits randomly selected coins received as payment from the user for real-time probabilistic auditing, as represented by the partial real-time "Probabilistic Audit" branch 38. The audit may be performed by the bank or by an auditor. Exemplary probabilistic audits are described in the above-incorporated U.S. Pat. No. 5,872,844. With this system, a fraction of spent coins are audited periodically in an effort to statistically detect fraudulent behavior. The bank also submit all deposited assets to the auditor to perform a comprehensive "after-the-fact" or "deterministic" audit on all deposited assets to discern conclusively whether any fraudulent expenditure has occurred. This is represented by the "Deterministic Audit" branch 40.

The electronic asset system 30 makes several assumptions. One assumption is that only the bank and the auditor are trusted, and not the user and vendor. Another assumption is that the cost of breaking a wallet exceeds the maximum theft. The upper bound of the cost is described in an article by Yacov Yacobi, entitled "Risk Management for e-cash Systems with Partial Real Time Audit", which was published in Financial Cryptography'99. Letting $b=d^2$, where d is the audit rate, then theft is $<(e^b-1)^{-1}$. The cost of subverting the audit process is further assumed to exceed the maximum allowed balance in a wallet.

All communication channels 32, 34, 36, 38, and 40 among the participants are protected via conventional cryptographic techniques to preserve privacy. The communication channels are representative of many different types of connections, including direct local connections or remote connections over a communication network, such as a public network (e.g., the Internet, telephone, cable TV, etc.) or a wireless network (e.g., cellular phone, paging network, satellite, etc.). These channels are secured using cryptography protocols, such as secure channel protocols (e.g. SSL) and secure messaging protocols.

All participants initially register with a certifying authority (not shown). In some environments, the bank functions as the certifying authority. Alternatively, the registering function is performed by a separate trusted entity. The certifying authority issues certificates that are later used by the parties in a transaction to verify the identity of each other. The certifying authority's role is limited to the registration process, and possibly in the revocation process (although this could be done by a separate entity) and has no part of the payment transaction after this initial registration process.

The four phases—withdrawal, payment, deposit, and audit—are described below in more detail.

Withdrawal

Figure 2:
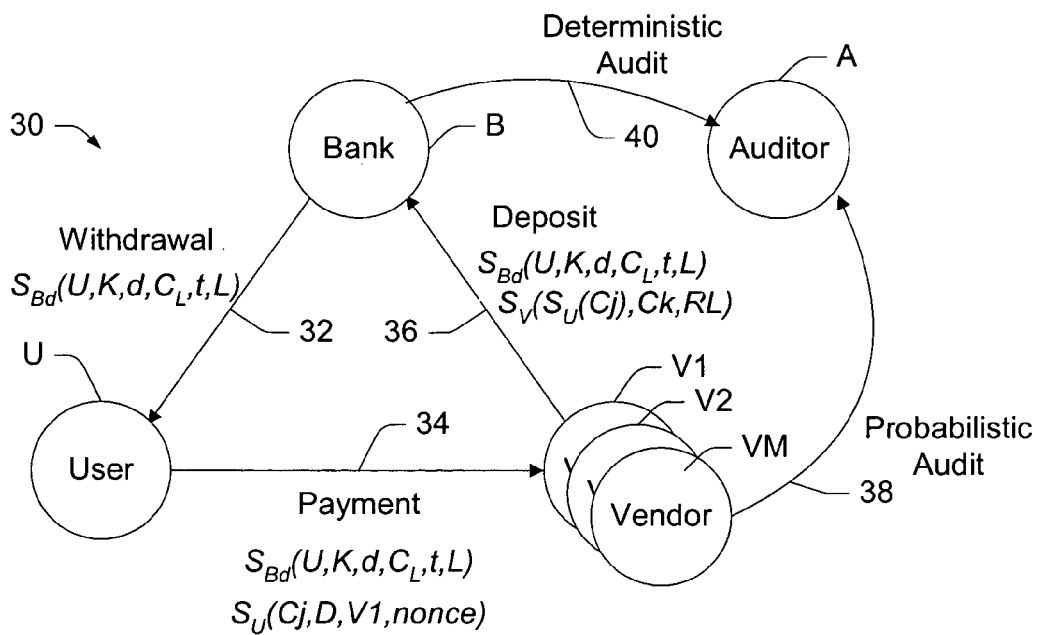
FIG. 2 is a general diagrammatic illustration of an electronic asset system that is implemented using a minting process according to one aspect of this invention.
Figure 3:
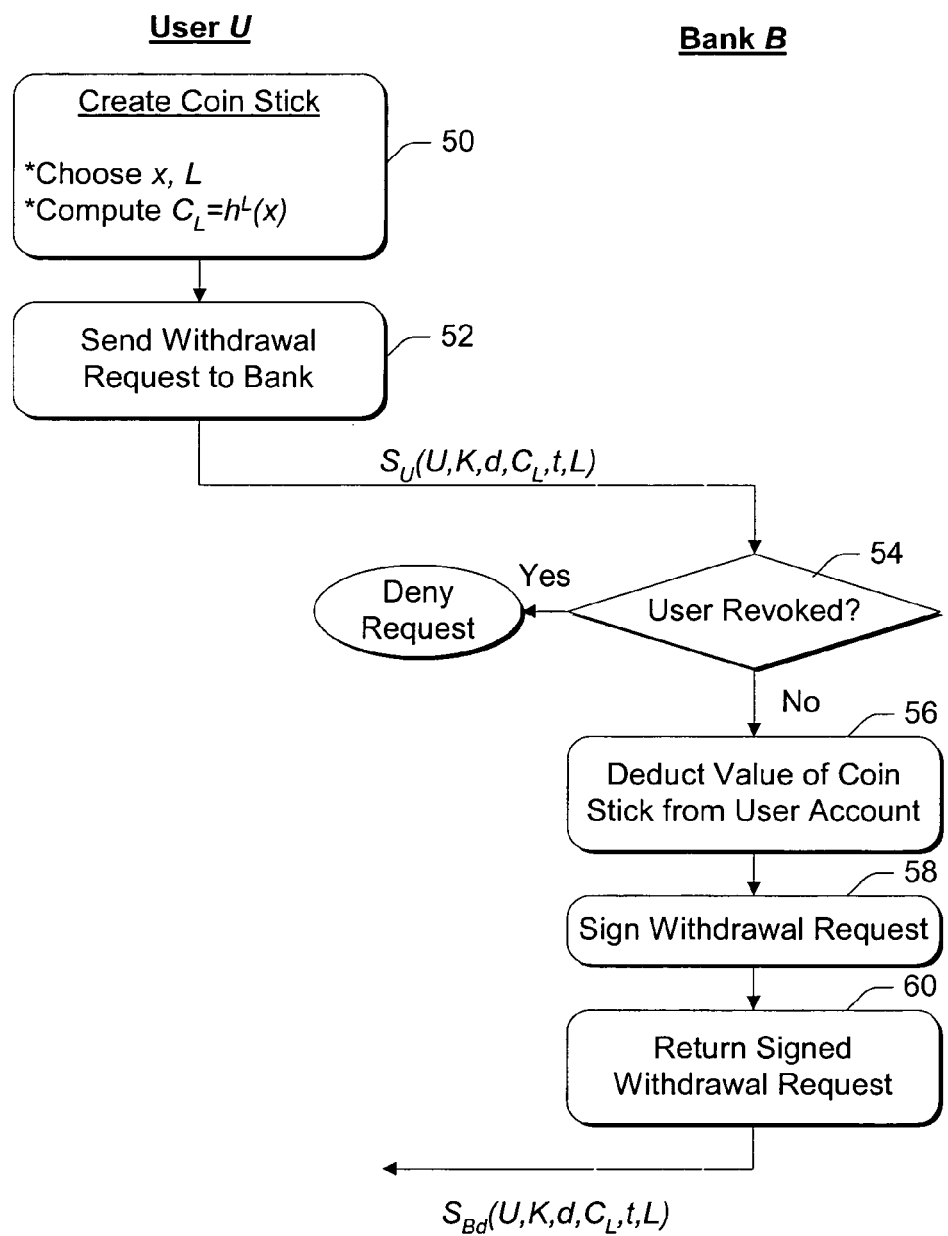
FIG. 3 is a flow diagram illustrating a withdrawal process for the electronic asset system.

FIG. 3 shows the withdrawal process for the electronic asset system 30 (i.e., branch 32 of FIG. 2). Initially, the user U has a public key K (and corresponding private key) and a certificate $CERT_U$. Certificates are used to authenticate users. More explicitly, the certificates authenticate the linkage between a user and his public key K.

Computing devices/wallets associated with the user and bank perform the steps in software, hardware, or a combination thereof.

At step 50, the user creates its own stick of L coins, in which each coin has the same denomination d. The user chooses a random starting value x and a length L (i.e., number of coins) and computes individual coins $C_1, C_2, \ldots, C_L$ using a one-way hashing function h( ), as follows:

$$C_1 = h(x)$$
$$C_2 = h(h(x))$$
$$\vdots$$
$$C_L = h^L(x)$$

This can be summarized as:

$$C_i = h^i(x) \text{ (for } i=1, \ldots, L)$$

The stick is thus composed of L coins, where $C_1$ is the top coin in the stick and $C_L$ is the bottom coin. Enabling the user to create its own stick is one distinction from the Payword technique discussed in the Background section. It streamlines the withdrawal process for the bank because the bank is no longer required to create the coin stick.

At step 52, the user presents a withdrawal request containing the stick and additional information to the bank. The withdrawal request z includes the user identity U, the user's public key K, the denomination d, the bottom stick value $C_L$, the length L, and an expiration t:

Withdrawal Request $z = (U, K, d, C_L, t, L)$

The bank sets the expiration time t, but this value is known to the user and submitted as part of the withdrawal request. The user signs the request (creates $S_U(z)$) and sends it to the bank.

At step 54, the bank determines whether the user identity U has been revoked for any reason (e.g., overdrawn account, past fraudulent expenditure, etc.). If so, the request is denied. Otherwise, if U has not been revoked and there are sufficient funds in the account, the bank deducts the value of the stick from the user's account (step 56). At step 58, the bank signs the withdrawal request using its own signing key for the requested denomination, $B_d$, to authorize use of the coin stick:

Signed Withdrawal Request $w = S_{Bd}(z) = S_{Bd}(U, K, d, C_L, t, L)$

At step 60, the bank returns the signed withdrawal request to the user.

Another advantage of this withdrawal process as compared to Payword is that the coin stick is not dedicated to a single vendor. None of the steps in the minting process utilizes a vendor identity. Thus, the user is free to spend coins from the same stick with different vendors. Generally speaking, the withdrawal process is as efficient as that of Payword.

Payment

Figure 4:
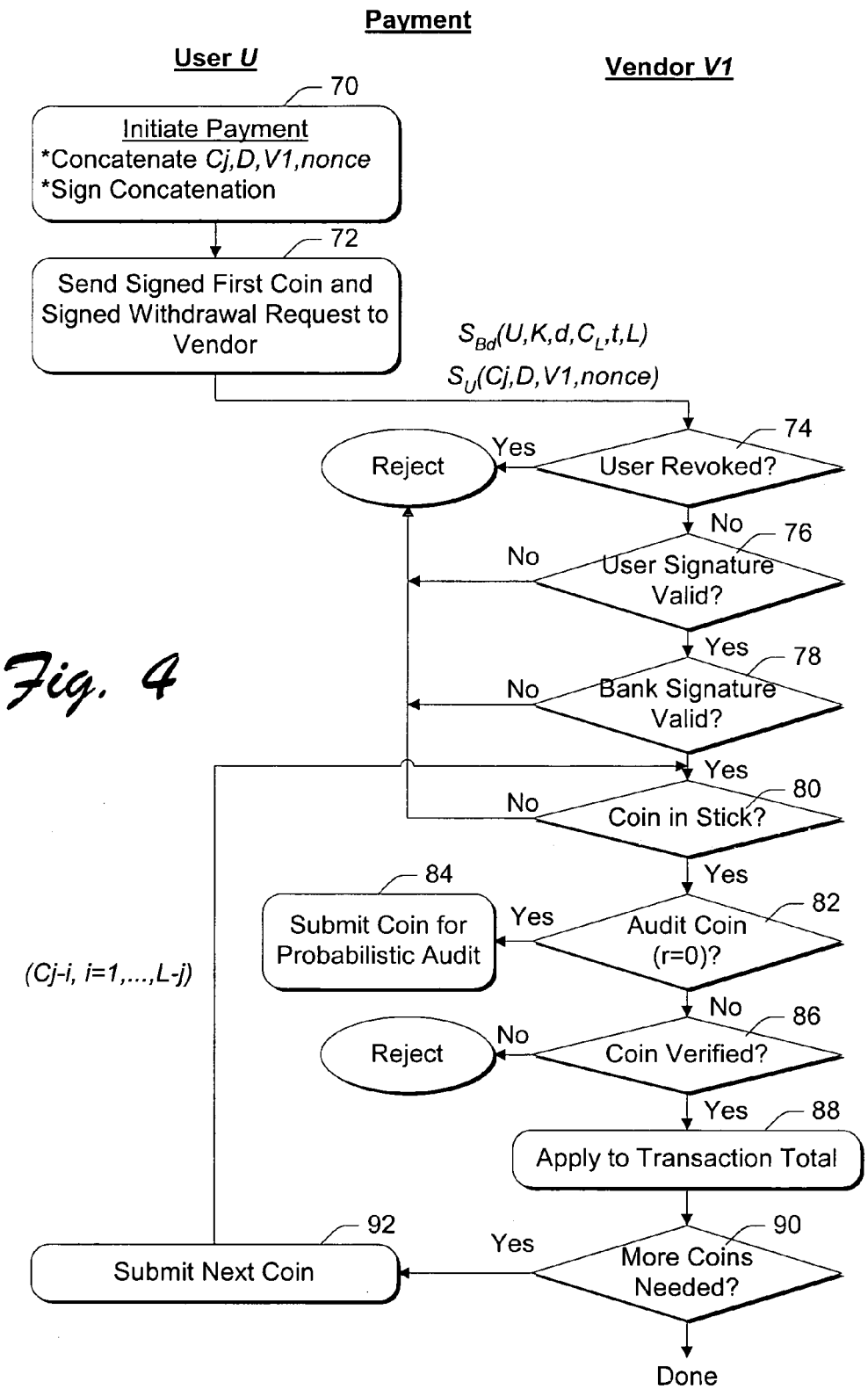
FIG. 4 is a flow diagram illustrating a payment process for the electronic asset system.

FIG. 4 shows the payment process for the electronic asset system 30 in which the user pays one or more coins to one or more vendors (i.e., branch 34 in FIG. 2). Computing devices/wallets associated with the user and vendor perform the steps in software, hardware, or a combination thereof.

At step 70, the user initiates a payment to a vendor V1. The user forms a payment request by concatenating the first coin of the payment, Cj, with additional information including a depth D measuring a distance from the bottom of the stick to the first coin of the payment Cj, the vendor identity V1, and a nonce. The user signs the payment request using its private signing key:

Signed Payment Request $= S_U(Cj, D, V1, \text{nonce})$

At step 72, the user sends the signed payment request along with the signed withdrawal request to the vendor.

At steps 74–86, the vendor performs a number of verifications. First, the vendor determines whether the user identity U has been revoked for any reason (step 74). If not, the vendor next verifies the user's signature using the user's public key (step 76). If it is valid, the vendor proceeds to verify the bank's signature (step 78). If any one of these tests fails, the payment is rejected.

At step 80, the vendor determines whether the coin is contained within the stick by comparing the depth D with the overall stick length L. The stick length L is derived from the signed withdrawal request $S_{Bd}(U, K, d, C_L, t, L)$. If the coin falls outside the stick, the transaction is rejected.

The vendor randomly selects certain coins for partial probabilistic auditing. The vendor maintains an internal source of randomness r that triggers when a coin 9 is sent for an audit. For example, suppose the random value r is one byte in length, and the vendor submits a coin for audit each time the value r is zero. Accordingly, at step 82, the vendor checks whether the random value r equals zero. If it does, the vendor submits the coin Cj for probabilistic audit (step 84). This audit is described below under the heading "Probabilistic Audit".

Assuming every test is met, the vendor verifies the coin Cj using the bottom coin $C_L$ (derived from the signed withdrawal request) and the hashing function h(x) (step 86). More particularly, the vendor determines whether hashing the proffered coin Cj the number of times equal to the stick depth D equals the bottom coin $C_L$:

Does $h^D(Cj) = C_L$?

If the computation yields a match, the proffered coin Cj is verified, accepted by the vendor, and applied toward the payment transaction (step 88). The vendor then determines whether more coins are forthcoming (step 90). If so, the user sends the next coin in the stick, Cj–1 (step 92). Unlike the first coin, however, the user does not sign this next coin. In fact, the user does not sign any subsequent coin in a run of coins being paid to the vendor. Hashing is four orders of magnitude faster than signing, and thus the payment phase offers the same efficiencies as Payword in that only one signature is evaluated when spending multiple coins from a single stick.

The process returns to step 80, where the vendor determines whether the next coin Cj–1 is contained within the stick. If so, the vendor evaluates whether this coin should be audited (step 82) and then verifies the coin (step 86):

Does $h(Cj-1) = Cj$?

Verifying each successive coin in the run can be generalized as follows:

Does $h(Cj-k-1) = Cj-k$?

Once the user has paid the correct value and the run of coins is completed (i.e., the "no" branch from step 90), the payment phase is concluded.

Deposit

Figure 5:
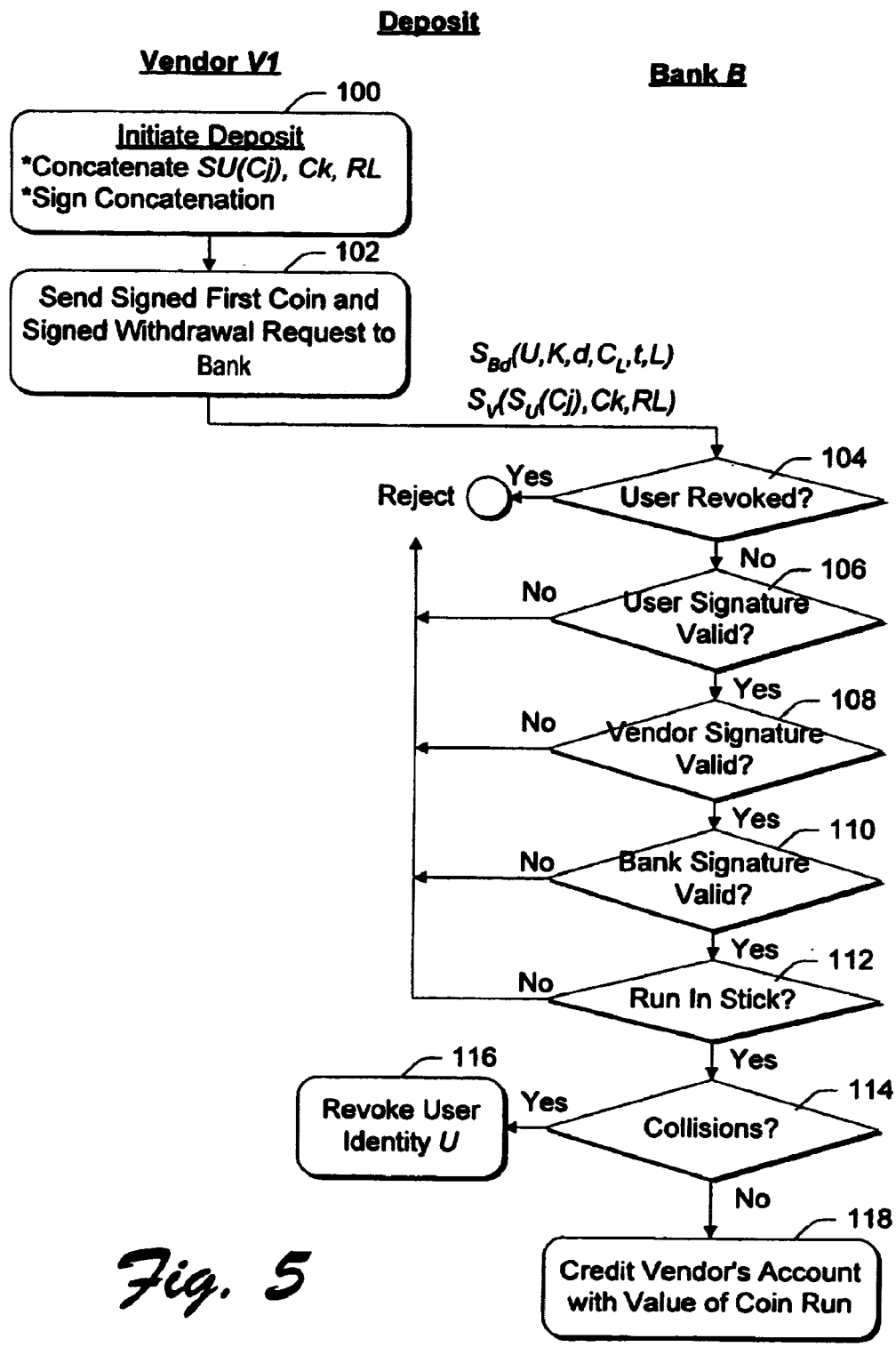
FIG. 5 is a flow diagram illustrating a deposit process for the electronic asset system.

FIG. 5 shows the deposit process for the electronic asset system 30 in which a vendor deposits one or more coins collected from the user to the bank (or other collection agency) (i.e., branch 36 of FIG. 2). Computing devices/wallets associated with the vendor and bank perform the steps in software, hardware, or a combination thereof.

At step 100, the vendor periodically initiates a deposit of coins received from a user (e.g., at the end of the day). Suppose the vendor has collected a run of coins having a run length RL (where run length RL<stick length L) beginning with coin Cj and ending with coin Ck. The vendor concatenates the signed first coin received from the user, $S_U(Cj)$, the end coin Ck, and the run length RL to form a deposit request. The vendor then signs the deposit request using its private key:

Signed Deposit Request=$S_V(S_U(Cj),Ck,RL)$

At step 102, the vendor sends the signed deposit request along with the signed withdrawal request to the bank.

At step 104, the bank determines whether the user identity U has been revoked for any reason. If not, the bank verifies the user's signature $S_U$ on the first coin Cj using the user's public key (step 106). If it is valid, the bank verifies the vendor's signature $S_V$ on the signed deposit request (step 108). If valid, the bank verifies its own signature $S_{Bd}$ on the signed withdrawal request (step 110). If anyone of these tests fails, the payment is rejected.

Assuming all signatures are valid, the bank determines whether the run length RL is within the stick length L (step 112). If this test is successful, the bank determines whether any coins in the run beginning with coin Cj and ending with coin Ck collide with any previously spent coins (i.e., two or more identical coins), thereby indicating that the coins have been fraudulently multi spent (step 114). This determination is an "after-the-fact" analysis that evaluates every coin deposited by the vendors. If one or more collisions occur, the bank revokes the user identity U to thwart other attempts to fraudulently spend coins (step 116). If no collisions are found, however, the bank credits the vendor's account with the value of the run with length RL (step 118).

Alternatively, the bank may send the coins out to the auditor (i.e., branch 40 in FIG. 2) to have the auditor perform the collision tests.

Certificates issued for users and wallets are given a short expiration. This reduces the size of certificate revocation lists (CRLs) that reside on each vendor-wallet. New certificates are issued with new wallets. New certificates and keys are supplied in new keyed-SRI (Software Resistance to Interference) containers.

The cost of processing a deposit of a run is approximately the same as the cost of depositing a whole stick in PayWord. In addition, if the audit sampling rate is d=1/L then it is highly likely that each stick is audited once before deposit. The present method enables impulse shopping at a lower cost than traditional schemes of independent coins.

Partial Probabilistic Audit

As shown at steps 82 and 84 of FIG. 4, the vendor occasionally submits a randomly selected coin to an auditor (which may or may not be the bank) for a determination of whether the coin has been double spent. The probabilistic audit is described in detail in U.S. Pat. No. 5,872,844 and U.S. Pat. No. 5,878,138.

The auditor receives the sample coins from the vendors. With sticks of 100 coins and an audit rate of 1%, roughly one coin from every stick is submitted to the auditor. The sample coins are sent over a protected communication channel. The auditor compares the coin with other coins to determine whether there is any collision (i.e., meaning there are two or more identical coins), thereby indicating that the coins have been used in a fraudulent manner (e.g., double spent, transferred from a single payer wallet to multiple payee wallets, etc.). Upon detection, the auditor revokes the user identity U by adding the identity to a certificate revocation list (CRL) that is posted publicly and/or sent to participating vendors to stop future attempts to commit fraud.

The CRL can be broadcast to the electronic wallets over a data communication network, such as a public network (e.g., the Internet) or a wireless network (e.g., cellular phone and paging network). The wallets are equipped with receivers to receive the broadcast transmission of the list. The entire list can also be posted to a central location (e.g., an Internet web site) so that anybody can access and download it.

The CRL is relatively short because it only contains the identities of bad user-wallets (and not individual bad coins) and because the certificates issued to the wallet have comparatively short expiration terms. As a result, the list can be stored locally on each vendor-wallet. When a user on the list next attempts to spend assets (whether fraudulently or not), the vendor will refuse the transaction.

According to this probabilistic fraud detection scheme, the criminal might successfully double spend electronic assets during initial transactions. But, due to early detection through sampling, the criminal is eventually prevented from further fraudulent use of the bad wallet. The fraud detection occurs with high probability before the criminal can break-even on the initial investment required to clone the wallet in the first place and make an illegitimate profit. Once fraud is detected, further perpetuation by the same broken wallet is prevented.

Security

The bank's ultimate requirement is that assets cannot be stolen. In the case of electronic coins, this requirement means that coins cannot be double spent. If every coin is audited when used, this requirement can be satisfied. However, when the audit rate is not deterministic, theft cannot be altogether prevented.

A payment system is considered sound if the breaking cost of a wallet exceeds the expected theft from that wallet and its clones until it is revoked (once revoked, the clones are all revoked as well). A system, which is fully audited in real-time, is by definition sound. However, partially audited systems can be sound if there is some amortized cost associated with breaking every wallet. For every breaking cost, there is a corresponding audit rate that guarantees soundness. Let $0<d<1$ be the audit rate. The expected theft from a broken coin-wallet is upper bounded by $B=(e^d-1)^{-1}$. (See, Yacobi, Financial Crypto'99, referenced above).

There are generally four types of attacks that do not require breaking a wallet: (1) attacks by the user, (2) attacks by the vendor, (3) collusion between users and vendors, and (4) timing attacks. In the first type of attacks, a user might attempt to spend more coins than included in the stick. The system 30 prohibits spending coins beyond the length of the stick L because the stick length is included in the signed withdrawal receipt $S_B(U,K,C_L,t,L)$ and verified on the first payment of each run. (Multi spending is blocked via audit).

In the second type of attack, a vendor might claim that the same coin was paid more than once. However, the system 30 thwarts this attack by requiring the vendor to check for multiple spending before acceptance. Further, the vendor cannot deposit the same coin twice because the bank checks for double spending. A vendor may also try to claim a gap between two runs he legitimately received. In this event, some other merchant will claim (parts of) the same gap and will prove legitimate ownership of that gap. This will incriminate the vendor. The system implements a policy that the first party to deposit a multi-spent coin wins (FDW) unless that party is proven guilty of fraud. If the vendor is found to have committed fraud, its account is not credited under the FDW deposit policy.

In the third type of attack, a user colludes with multiple vendors. The user pays the same coin to each vendor and the vendors evade the audit and try to deposit the multiple coins. However, the FDW deposit policy only permits the first depositor to collect the money, and hence the colluding group as a whole has no gain.

In the fourth type of attack, an adversarial user measures the time that a vendor takes to accept a coin. If it is longer than usual, the user assumes that the coin is being audited and does not double spend anymore from this stick. To combat this attack, the vendor delays all transactions by the current average time taken by one audit round.

Anonymous System

The electronic asset system 30 can be modified to provide a good level of anonymity while being almost as efficient as the non-anonymous system described above. Furthermore, anonymity can be conditional. Upon court order, a trustee can act to make coins traceable to their user (which is a NSA requirement for any anonymous system). In system 30, the trustee is involved only in the certification process, while in other systems the trustee is involved in any withdrawal and has to do some small computation per each coin.

The goal of an anonymous system is to break the linkage between a user and the transactions, as viewed by the bank and the vendors. In system 30, users have pseudonyms (certificates which are not linked to user ID) that they can change at will. The general concept is that users maintain a pseudonym as long as the shopping pattern does not provide enough information to identify them, and then initiate a pseudonym change process. Certifying authorities that issue certificates will approve the pseudonym change if the old pseudonym is in good standing. The bank or the vendor cannot link a pseudonym to the user's account.

The anonymous electronic asset system breaks the linkage between a user and its coins in two places. First, the coins are de-coupled from the corresponding bank account using blind signatures. A "blind signature" is the electronic kin of signing an envelope containing a document and a carbon copy. The signature is pressed through the envelope and appears on the document, but the signer has no idea what it is signing. Only the recipient can extract the signed message from the envelope. Blind signatures are described in greater detail in the Schneier book (use the CRC book) identified at the beginning of Detailed Description Section.

Figure 6:
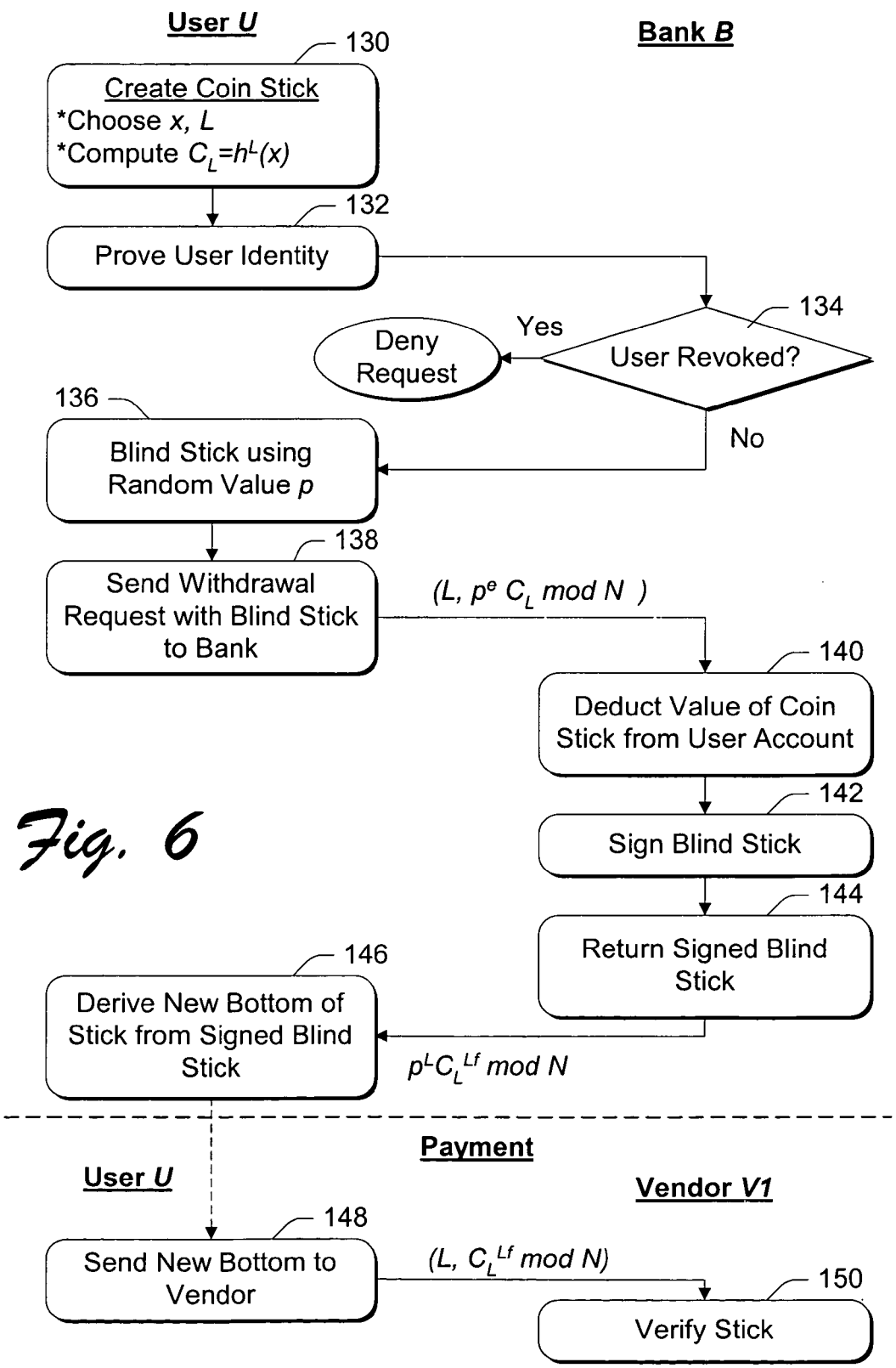
FIG. 6 is a flow diagram illustrating a blind withdrawal process for the electronic asset system to render the user anonymous.

Second, the system de-couples the linkage between a user and the user's wallet. Trustees are relied upon to expose the identity of double spenders upon legal court order. FIG. 6 shows an anonymous withdrawal process to blind coin sticks and the subsequent payment process using coins from the blind stick. At step 130, the user creates its own stick of L coins. As before, the user chooses a random starting value x and a length L (i.e., number of coins) and computes individual coins $C_1, C_2, \ldots, C_L$ using a one-way hashing function ( ), as follows:

$$C_1 = h(x)$$
$$C_2 = h(h(x))$$
$$\vdots$$
$$C_L = h^L(x)$$

The stick is composed of L coins, where $C_1$ is the top coin in the stick and $C_L$ is the bottom coin. At step 132, the user proves its identity U to the bank. The bank determines whether the user identity U has been revoked for any reason (e.g., overdrawn, perpetuating fraud, etc.) (step 134). If so, the withdrawal request is denied. Otherwise, if U has not been revoked, the bank allows the user to proceed.

At step 136, the user blinds the coin stick by multiplying the bottom by some random secret p, as follows:

Blind Stick (bottom)=$p^e C_L$ mod N where N is the bank's modulus and e and f (introduced below) are the bank's public and secret exponents, respectively. At step 138, the user sends a withdrawal request having the stick length L and the blind stick $p^e C_L$ mod N to the bank.

The bank deducts the value of the stick from the user's account (step 140). At step 142, the bank signs the blind stick by computing:

$$c=(p^e C_L)^{Lf}=p^L C_L^{Lf} \bmod N$$

The bank returns the signed blind stick c to the user (step 144). At step 146, the user derives a new value for the bottom of the blinded stick by computing:

$$C_L^{Lf}=c/p^L \bmod N.$$

The bottom of the new stick is (L, $C_L^{Lf}$ mod N).

During the payment phase, the user passes the new stick bottom (L, $C_L^{Lf}$ mod N) to the vendor (step 148). At step 150, the vendor verifies the stick by computing the original last coin $C_L$ and then computing $C_L^L$ mod N. The vendor then determines:

Does $C_L^L=(C_L^{Lf} \bmod N)^e \bmod N$?

If the determination is true, the stick is positively verified; else, the transaction is rejected.

Coupons

Coupons are one specific class of electronic assets supported by the electronic asset system 30. Coupons are offered to users by vendors (or third party sources) and employed by the users in place of other asset types (e.g., electronic coins). Unlike other asset types, coupons do not require bank involvement. But, coupons pose new problems that are not encountered with other electronic assets. The problems stem from the fact that the role of the bank is played by the vendor. While the bank is trusted, this same assumption cannot be made for the vendor.

Accordingly, in the coupon context, there is a mutual suspicion between the user and the vendor about how many unused coupons the user holds. It is in the vendor's interest to under account for the number of unused coupons, thereby making the balance of "free" coupons smaller and forcing the user to utilize electronic coins (or other asset types). Conversely, it is in the user's interest to over account for the number of unused coupons, thereby making the balance of "free" coupons larger so that the user can utilize these coupons in place of electronic coins (or other asset types).

The electronic asset system 30 can be configured to automatically resolve disputes between the user and vendor at a very low cost. The system employs a "linked dual-stick" data structure in which the user and vendor each maintain a stick of coupons. The sticks mirror one another and the method for handling coupons maintains identical reciprocity so that neither the user nor the vendor is able to cheat without the other party's knowledge. Furthermore, disputes can be resolved with the honest party being able to prove its case in court.

To describe the coupon architecture, consider the case of a single vendor in which a user U receives a coupon for vendor V (for instance, in consideration for reading an advertisement from the vendor). The user later spends the coupon with vendor V. The linked dual-stick data structure tracks when the user is granted coupons and when the user spends them with the vendor.

Figure 7:
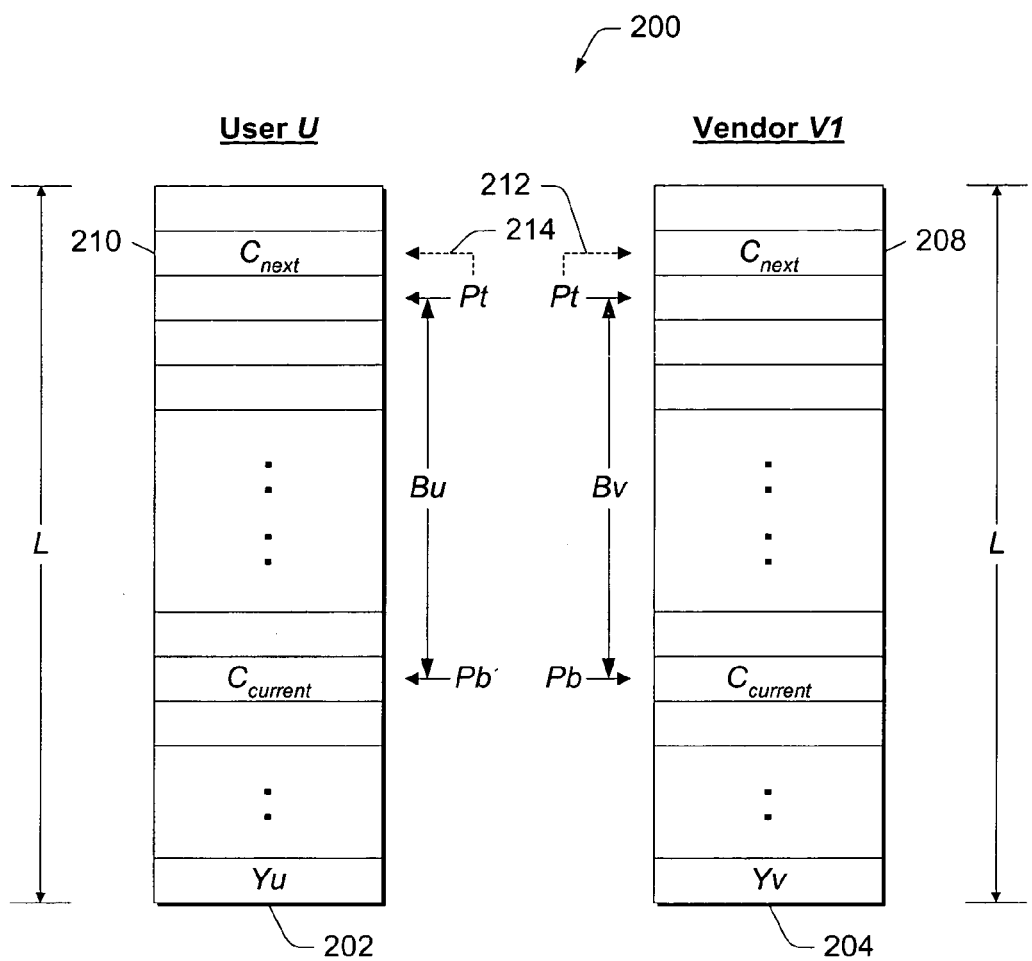
FIG. 7 is a diagrammatic illustration of a linked dual-stick structure used to manage collection and expenditure of coupons in the electronic asset system.

FIG. 7 shows the linked dual-stick data structure 200 having a user stick 202 and a vendor stick 204. Each stick is configured according to a FIFO (first in first out) policy, where earned coupons are added to the top of the stick and spent coupons are removed from the bottom of the stick. Each stick has two pointers: a top pointer Pt and a bottom pointer Pb. As coupons are added, the top pointer Pt is incremented to reflect new coupons that are now available for use. As coupons are spent, the bottom pointer Pb is incremented to reflect their expenditure and reference the next unused coupon in the stick to be spent. The balance of available coupons, B, is equal to the difference between the top and bottom pointers (i.e., B=Pt−Pb).

It is noted that the vendor maintains many vendor sticks on behalf of the many users. Generally, the vendor maintains at least one coupon stick for each corresponding user. Also, each user may have multiple sticks, at least one for each vendor. Furthermore, in practice, both the vendor and the user maintain the entire dual-stick structure locally so that the vendor maintains a copy of the user's stick and the user maintains a copy of the vendor's stick. For discussion purposes, FIG. 7 only shows the vendor stick for the user U, and the user stick for vendor V.

Figure 8:
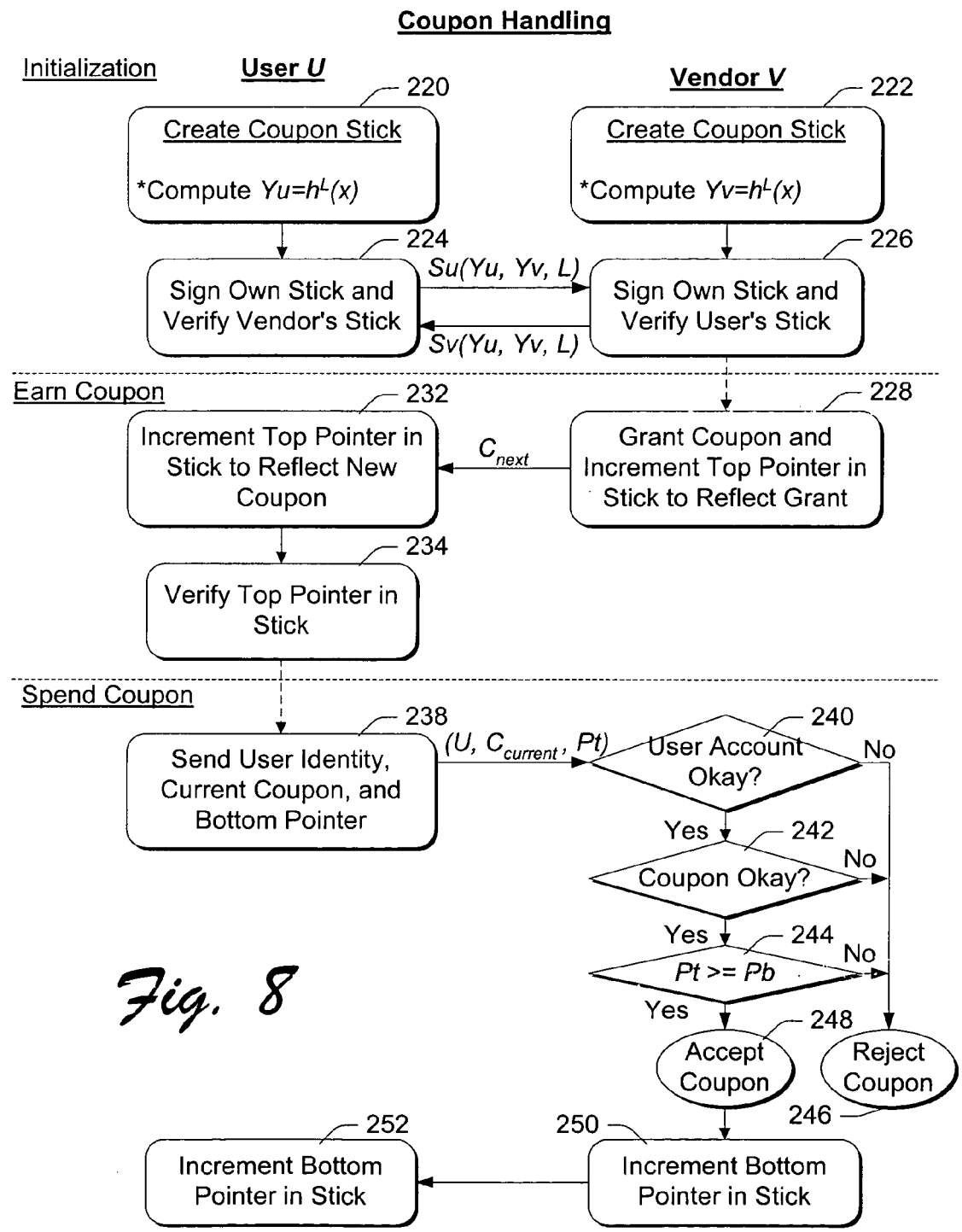
FIG. 8 is a flow diagram illustrating a coupon handling process for the electronic asset system.

FIG. 8 shows a process for managing the linked dual-stick data structure. As mentioned earlier, the vendor has an interest in decreasing the balance B (i.e., narrowing the gap between the top and bottom pointers) while the user has an in interest in increasing the balance B (i.e., widening the gap between Pt and Pb). The process prohibits the user and vendor from cheating one another, even without the presence of a trusted third party (e.g. bank). The steps shown in the process can be implemented in software, hardware, or a combination of both. The process is described with reference to the data structure of FIG. 7.

At steps 220 and 222, both the user and the vendor create their own stick having a predetermined length L in a similar manner as that described above with respect to step 50 (FIG. 3). The user's stick 202 has a bottom value Yu and the vendor's stick 204 has a bottom value Yv. At steps 224 and 226, the user and vendor sign and verify three variables: the length L, the user's stick bottom value Yu, and the vendor's stick bottom value Yv. This creates the linked dual-stick structure.

Now, first consider the process of earning coupons, which affects the vendor sticks V at both the vendor site and the user site. Suppose the user is granted the next coupon on the vendor's stick. For example, the user clicks on an advertisement at the vendor's Web site and is granted the next coupon in return. The next coupon is illustrated as "$C_{next}$" in entry 208 of the vendor's stick 204. At step 228 (FIG. 8), the vendor increments its top pointer Pt to reflect the grant, as represented by dashed pointer 212 in FIG. 7.

The user increments the top pointer Pt in its stick 202 to reference the next coupon "$C_{next}$" at entry 210, as represented by the dashed pointer 214 in FIG. 7 (i.e., step 232 in FIG. 8). The user then verifies the new coin using one application of the hash function by checking whether H(new coupon) equals the previous coupon. (step 234).

Next, consider the process of spending coupons, which affects the user sticks U at both the vendor site and the user site. Suppose the user spends a coupon, for instance, by clicking a link at the vendor's Web site that consumes a coupon. At step 238, the user submits its identity U and the current coupon "$C_{current}$" being referenced by the bottom pointer Pb. The vendor checks if the user has a properly initialized account that is in good standing (step 240). Assuming this is the case, the vendor evaluates whether the coupon is consistent with its own view of the stick (step 242). The vendor makes this determination by hashing to the location in the stick. Finally, at step 244, the vendor determines whether the top pointer Pt for the stick is still above the bottom pointer Pb (i.e., Pt≧Pb). Failure of this latter test indicates that the user is trying to spend coupons that either do not exist or have not been granted by the vendor. Failure of any one of these tests results in rejection of the coupon (step 246).

If all three tests are successful, the vendor accepts the coupon in place of actual payment (step 248). Both the user and the vendor increment their versions of the bottom pointer Pb (steps 250 and 252).

From time to time, the sticks 202 and 204 may not mirror one another. For instance, if the vendor's stick indicates that the top pointer Pt is below the bottom pointer Pb and the user's stick 202 shows the top pointer Pt is above the bottom pointer Pb, the user will be asked to submit his top pointer and the top coupon to prove its validity to the vendor. The vendor can verify the coupon via a series of hashes. This batch processing is computationally inexpensive.

With the linked dual-stick data structure, the user cannot increase the coupon balance Bu because the vendor can prove to the contrary. Similarly, the vendor cannot decrease its coupon balance Bv for this user because the user can prove otherwise.

The vendor may try to claim that it received the same coupon beforehand, and refuse to honor the proffered coupon. In this case, the vendor can illegally gain only one coupon, and it is not worth blocking this attack. In large coupon redemption (e.g. getting a free flight for a lot of miles), the protection is warranted. In this situation, the user first sends the new pointer Pb, and the vendor sends back a signed declaration that it has not received coupons in the gap between the new pointer Pb and the old one. If the vendor claim otherwise, it is forced to show the contradicting coupons. Upon receiving the signed declaration, the user sends the coupon corresponding to the new bottom pointer Pb.

The above discussion addresses the single vendor case. However, with tamper-resistant protection it is suitable for multiple vendors with the addition of an auditing system. The threat for multiple spenders is that a user may double spend the same coupon with two vendors. To minimize this attack, the system audits a small sample of the coupons for double spending, and if such fraudulent expenditure is found, the whole coupon stick is void and the user's account is revoked.

Computers/Wallets

Each participant in the electronic asset system-bank, user, vendor, auditor-possesses tamper-resistant hardware/software devices. These devices may be implemented in fixed site computers or in portable devices. Secure devices designed to safely hold electronic assets are referred to as "electronic wallets".

There are two exemplary types of wallets that may be used in the electronic asset system 30. The first type of wallet is a dedicated hardware wallet, and the second type of wallet is a secure processor wallet. These types of wallets are described separately below.

Type I: Dedicated Hardware Wallet

Dedicated hardware wallets are equipped with some resistance to cloning and interference. Secret keys are not exposed outside the wallet. Examples of this wallet type include small portable computing devices with their own trusted displays and keyboards, smart cards, PC cards, or other technology that permit receipt, storage, and output of electronic assets, while resisting reverse engineering practices to expose secret keys.

Figure 9:
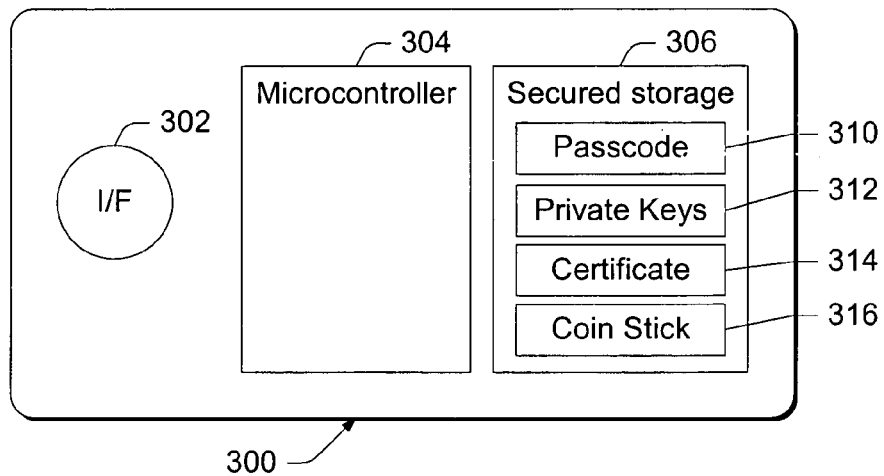
FIG. 9 is a block diagram of a dedicated hardware wallet that can be employed by participants in the electronic asset system.

FIG. 9 shows an exemplary dedicated hardware wallet 300 implemented as a smart card. The smart card-based wallet has an interface 302, a microcontroller or processor 304, and secured storage 306. The microcontroller 304 is preprogrammed to perform certain cryptographic functions (including hashing) and can read from and write to the secured storage 306. The microcontroller 304 responds to commands sent via an interface 302 and can send data in response to those commands back to the interface.

The secured storage 306 contains a passcode 310, one or more keys 312 (e.g., encryption and signing keys), a certificate 314, and a coin stick 316. Before it will perform any cryptographic functions involving the private keys 312, the wallet 300 is unlocked by a command sent in via the interface 308 that specifies a passcode matching the stored passcode 310. Once unlocked, the wallet can be instructed by other commands to perform cryptographic functions that involve the use of the private keys 312, without making them available outside of the smart card.

The programming of the microcontroller 304 is designed to avoid exposing the passcode 310 and private keys 312. There are no commands that can be issued to the microcontroller 304 via the interface 302 that will explicitly reveal the values of the passcode or the private key. In this manner, the smart card prevents a foreign application from inadvertently or intentionally mishandling the passcode and key in a way that might cause them to be intercepted and compromised. In constructing smart cards, manufacturers should take additional measures to ensure that the secured storage is hard to access even when the smart card is disassembled and electronically probed, and have measures against Timing attacks and Differential Power Analysis.(DPA).

Type II: Secure-Processor Wallet

The second wallet type is one that employs a general purpose secure-processor. A secure-processor wallet is especially architected to simulate a dedicated hardware wallet. The architecture relies on techniques such as authenticated boot and curtaining. The architecture and wallet code ensures that secret keys are exposed only inside the secure processor. The "authenticated boot" methodology employs certificates of authenticity provided by the operating system, the processor, and the computer to prove a certain trusted behavior. A certificate for the wallet is produced during installation by the bank, and this certificate is shown on the first transaction in each run and gravitates to the bank during deposit and audit. The "curtaining" methodology allows an application to be executed in a secure manner on an open system by ensuring that no other applications can access the data being used by the secure application unless explicitly authorized. A security manager, responsible for handling secure sections of memory, can provide a certificate that a particular application is executing in a secure section of memory, thereby proving the authenticity of the application.

Secure Processor Wallet with Authenticated Boot Architecture

Figure 10:
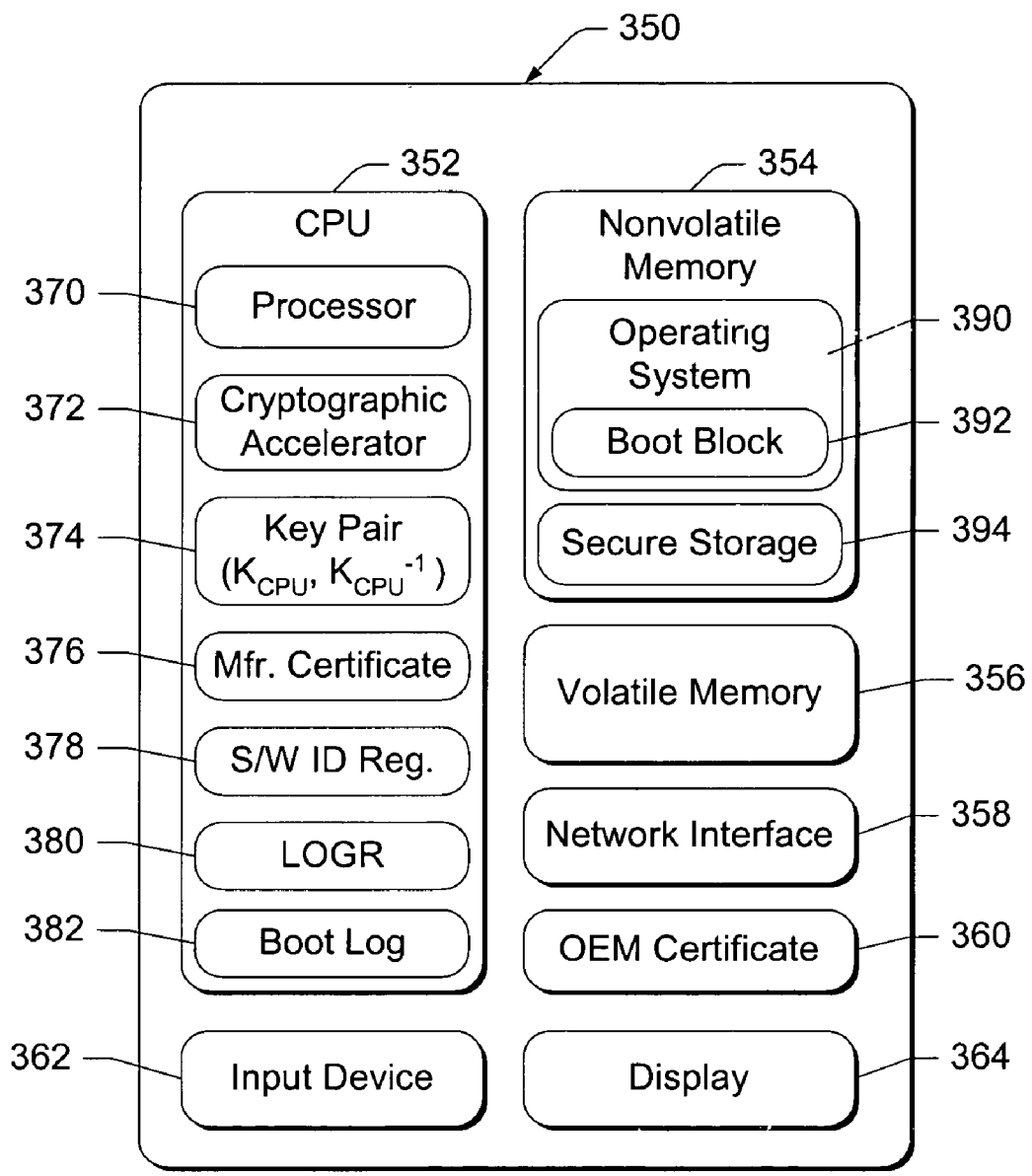
FIG. 10 is a block diagram of an exemplary secure-processor wallet that can be employed by participants in the electronic asset system. The secure-processor wallet employs an authenticated boot methodology to form a level of trust.

FIG. 10 shows a secure-process wallet 350 configured according to the authenticated boot methodology. The wallet 350 includes a central processing unit (CPU) 352, nonvolatile memory 354 (e.g., ROM, disk drive, CD ROM, etc.), volatile memory 356 (e.g., RAM), a network interface 358 (e.g., modem, network port, wireless transceiver, etc.), and an OEM certificate 360. The wallet may also include an input device 362 and/or a display 364. These components are interconnected via conventional busing architectures, including parallel and serial schemes (not shown).

The CPU 352 has a processor 370 and may have a cryptographic accelerator 372. The CPU 352 is capable of performing cryptographic functions, such as signing, encrypting, decrypting, authenticating, and hashing, with or without the accelerator 372 assisting in intensive mathematical computations commonly involved in cryptographic functions.

The CPU manufacturer equips the CPU 352 with a pair of public and private keys 374 that is unique to the CPU. For discussion purposes, the CPU's public key is referred to as "$K_{CPU}$" and the corresponding private key is referred to as "$K_{CPU}^{-1}$". Other physical implementations may include storing the key on an external device to which the main CPU has privileged access (where the stored secrets are inaccessible to arbitrary application or operating system code). The private key is never revealed and is used only for the specific purpose of signing stylized statements, such as when responding to challenges from a portable IC device, as is discussed below in more detail.

The manufacturer also issues a signed certificate 376 testifying that it produced the CPU according to a known specification. Generally, the certificate testifies that the manufacturer created the key pair 374, placed the key pair onto the CPU 352, and then destroyed its own knowledge of the private key "$K_{CPU}^{-1}$". In this way, nobody but the CPU knows the CPU private key $K_{CPU}^{-1}$; the same key is not issued to other CPUs. The certificate can in principle be stored on a separate physical device but still logically belongs to the processor with the corresponding key.

The manufacturer has a pair of public and private signing keys, $K_{MFR}$ and $K_{MFR}^{-1}$. The private key $K_{MFR}^{-1}$ is known only to the manufacturer, while the public key $K_{MFR}$ is made available to the public. The manufacturer certificate 376 contains the manufacturer's public key $K_{MFR}$, the CPU's public key $K_{CPU}$, and the above testimony. The manufacturer signs the certificate using its private signing key, $K_{MFR}^{-1}$, as follows:

Mfr. Certificate=($K_{MFR}$, Certifies-for-Boot, $K_{CPU}$), signed by $K_{MFR}^{-1}$ The predicate "certifies-for-boot" is a pledge by the manufacturer that it created the CPU and the CPU key pair according to a known specification. The pledge further states that the CPU can correctly perform authenticated boot procedures, as are described below in more detail. The manufacturer certificate 376 is publicly accessible, yet it cannot be forged without knowledge of the manufacturer's private key $K_{MFR}^{-1}$.

Another implementation in which a 'chain of certificates' leading back to a root certificate held by the processor manufacturer is also acceptable.

Similarly, the OEM (Original Equipment Manufacturer), the manufacturer of the computer as distinguished from the manufacturer of the processor, may provide an OEM certificate 360 that certifies that the design of the computer external to the processor does not include various known attacks against the secure operation of the processor. The OEM also has a pair of public and private signing keys, $K_{OEM}$ and $K_{OEM}^{-1}$. The OEM certificate is signed using the private key $K_{OEM}^{-1}$ analogous to the manufacturer's certificate 376 being signed by the processor manufacturer.

The CPU 352 has an internal software identity register (SIR) 378, which is cleared at the beginning of every boot. The CPU executes an opcode "BeginAuthenticatedBoot" or "BAB" to set an identity of a corresponding piece of software, such as operating system 390, and stores this identity in the SIR; the boot block of the operating system (described below) is atomically executed as part of the BAB instruction. If execution of the BAB opcode and the boot block fails (e.g., if the execution was not atomic), the SIR 378 is set to a predetermined false value (e.g., zero).

The CPU 352 also utilizes a second internal register (LOGR) 380, which holds contents produced as a result of running a LOG operation. The CPU 352 also maintains a "boot log" 382 to track software modules and programs that are loaded. In one implementation, the boot log 382 is a log in an append-only memory of the CPU that is cleared at the beginning of every boot. Since it consumes only about a few hundred bytes, the boot log 382 can be comfortably included in the main CPU. Alternatively, the CPU 352 can store the boot log 382 in volatile memory 356 in a cryptographic tamper-resistant container.

A further implementation is by means of a software module that allows each section of the booting operating system to write entries into the boot log that cannot be removed by later components without leaving evidence of tampering. Yet alternatively, the SIR can hold a cryptographic digest of a data structure comprising the initial boot block and the subsequent contents of the boot log. The operation of appending to the boot log (call this operation "Extend") replaces the SIR with the hash of the concatenation of the SIR and the entry being appended to the boot log. A straightforward implementation of this operation may be seen to modify the SIR. Note, however, that the operating system, when booting, can choose to add elements to the boot log without loading the corresponding components, and so a more privileged combination of software components can impersonate a less privileged one. This allows the controlled transfer of secrets across privilege levels. In this approach, software will keep its own plaintext copy of the boot log entries, along with the initial value of the SIR following boot, and this plaintext copy is validated by knowledge of the current composite SIR.

As an optimization, regardless of the implementation of the boot log, the OS may choose not to extend the boot log with the identities of certain software components, if these components are judged to be as trustworthy as the OS itself, or if they will execute only in a protected environment from which they will be unable to subvert operation.

The operating system (OS) 390 is stored in the memory 354 and executed on the CPU 352. The operating system 390 has a block of code 392 used to authenticate the operating system on the CPU during the boot operation. The boot block 392 uniquely determines the operating system, or class of operating systems (e.g. those signed by the same manufacturer). The OS manufacturer can also sign the boot block 392.

Once booted, the operating system 390 and other selected applications (e.g., banking applications) named in an access control list (ACL) by the owner of the computer can set aside space 394 in memory or disk 354 to hold private or confidential data in a secure manner, without fear of other operating systems or rogue applications reading the data in the space. The private data is protected by encryption using a key that is generated based in part upon a seed supplied by an authenticated and trusted OS, in part by a secret key stored in the CPU, and in part by the software identity register (SIR). The private data is stored with an ACL naming the applications that can use the data and the terms under which they can use it.

The authenticated boot process allows any software at any point in the boot sequence to initiate an authenticated boot.

Figure 11:
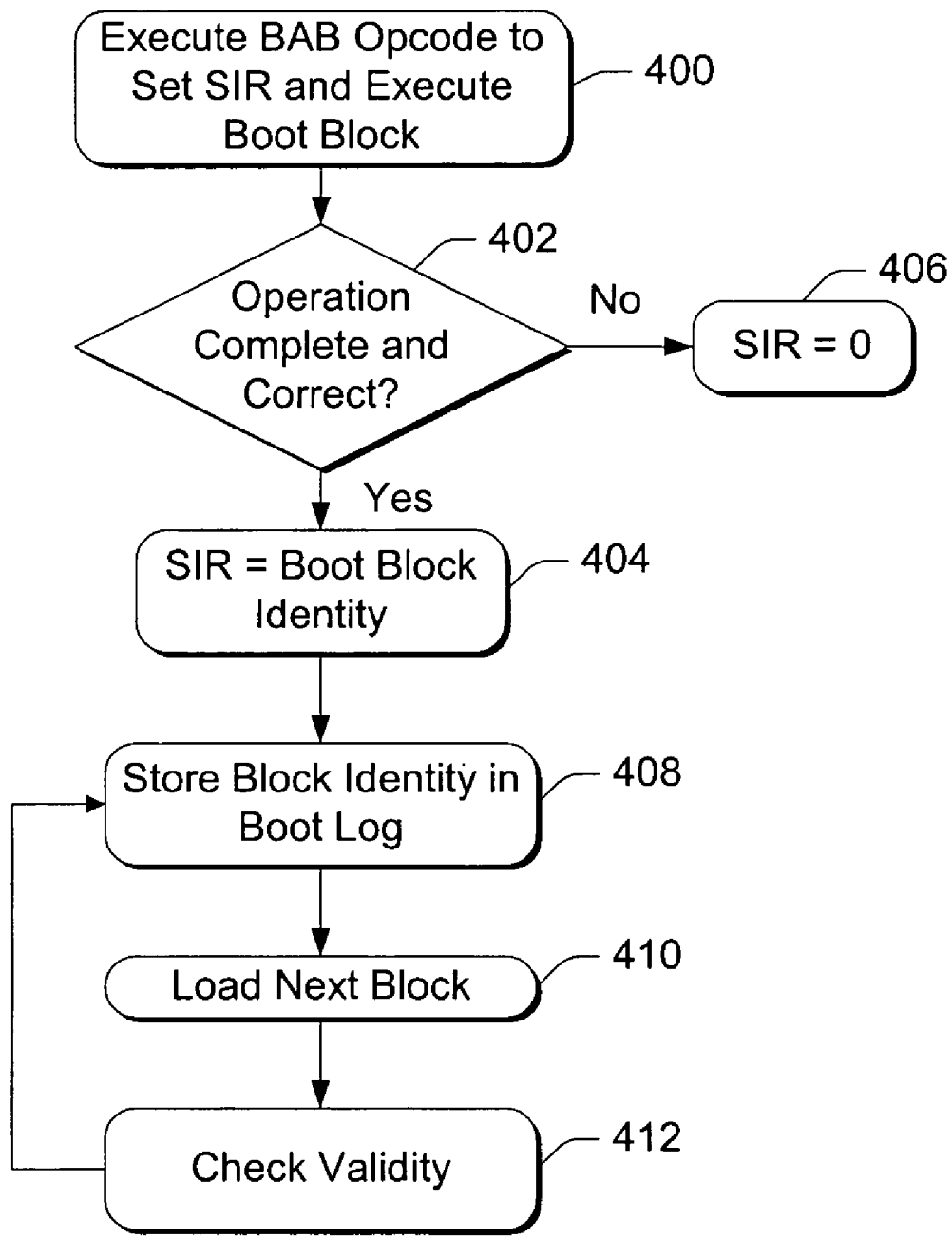
FIG. 11 is a flow diagram illustrating an authenticated boot process.

FIG. 11 shows steps in a method for performing an authenticated boot operation on the operating system 390. These steps are performed by the CPU 352 and OS 390 resident in the secure-processor wallet 350. At step 400, the CPU executes the BeginAuthenticatedBoot opcode in the signed boot block 392 to set an identity for the operating system 390. The identity can be a digest of the boot block's opcodes and data, or the public key corresponding to a signature on the boot block of the operating system.

The BeginAuthenticatedBoot opcode and the boot block execute as one atomic operation, with the implication that if they execute completely and correctly, the resulting operating system can be trusted. Measures are taken to ensure that the CPU is not interrupted and that the boot code that has just been validated cannot be modified. This can involve locking the memory bus and switching off interrupts. It could also involve having the CPU watch for interrupts or for writes by other bus agents and invalidate the authenticated boot sequence if they occur. The BAB opcode can be executed at any time, with one exemplary time being at the start of the OS loader, right after the OS-selector executes. An alternative implementation is to provide both a BeginAuthenticatedBoot (BAB) and an EndAuthenticatedBoot (EAB) instruction. The BAB instruction computes the secure hash of the boot block and the EAB instruction sets the SIR if the execution of the boot block was not interrupted or potentially modified by memory writes from another processor or another bus master.

Execution of the BeginAuthenticatedBoot opcode sets the internal software identity register 378 to either (1) the OS's identity (i.e., boot block digest or OS public key) if the operation is successful, or (2) zero if some event or circumstance has potentially subverted operation. Assuming the operation is successful (i.e., the "yes" branch from step 402), the SIR 378 is now a unique number or other value that represents the identity of the operating system 390 (step 404). Any two processors running the same operating system will produce the same SIR. If the BAB opcode operation is unsuccessful (i.e., the "no" branch from step 402), the SIR is set to zero (step 406).

At step 408, the CPU 352 fills the first entry on the boot log 382 with the public key (or digest) of the boot block 392. From now on, any running code can append data to the boot log 382, and it is generally used by code in the boot chain to identify code versions as they are loaded and executed. Appending data to the boot log can be simulated by modifying the SIR via an "Extend" operation.

The boot block 392 is free to load the next set of blocks in the boot-chain (step 410). At step 412, the boot block 392 checks the validity of the modules (by signature or other means) and loads them so that they can be executed. An identity for each module is appended to the boot log 382. The OS will also retain additional information on components that it loads (e.g., version numbers, device driver IDs, etc.). Loading and executing the code may result in loading more code, validating it, and executing it, etc. This process continues through to the loading of device drivers. When the boot sequence is complete, the OS is operational and the software identity register and the boot log store non-modifiable data captured during the boot sequence. Loading new device drivers can be recommenced at any point, possibly causing the operating system to become less privileged, with the possible termination of access to private data.

Secure Processor Wallet with Curtaining Architecture

Figure 12:
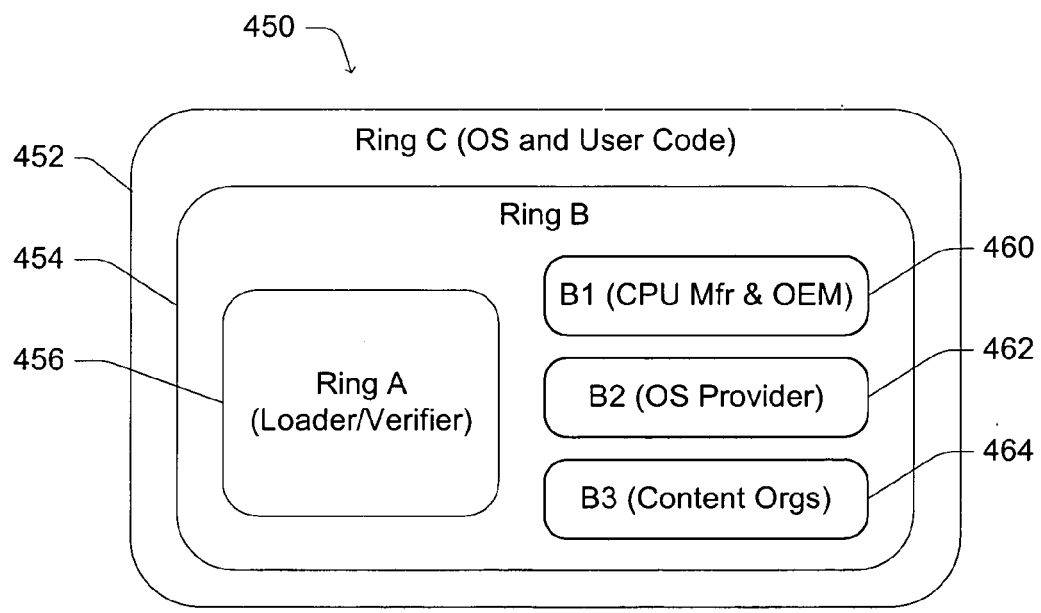
FIG. 12 is a diagrammatic illustration of memory space segmented to provide curtaining security in a secure-processor wallet.

FIG. 12 is a symbolic map of a memory space 450 in the secure-processor wallet 350 (FIG. 10). Space 450 can exist in a single physical memory, or in several different kinds of storage, such as ROM, read/write RAM, flash RAM, and so forth.

Space 450 has three regions or rings 452, 454, and 456. Outer ring 452 is called "Ring C" and has only conventional protection or security against any kind of read or write access by any code located there or in the other rings in the present system, and normally occupies almost all of the available address space. All normal user-mode code and data reside in this ring. The operating system, including the kernel, also resides there. Ring C has no read or write access to the other two rings.

Rings 454 and 456 are called "Ring B" and "Ring A", respectively. These two inner rings together form the secure or "curtained" region of memory. No program code in Ring C has any access to data within them. Ring C code can, however, be enabled to initiate execution of code located there. Conversely, any code in Rings A and B has full conventional access to Ring C, including reading and writing data, and executing program code.

Ring 454 has full access privileges to Ring C, but only restricted access to innermost ring 456. Thus, it can have both semi-permanent storage (e.g., nonvolatile flash RAM for code routines) and volatile read/write memory for temporary data (e.g., keys).

Ring 456 has full access to Rings B and C for both code and data. It can also employ both nonvolatile and volatile technologies for storing code and data respectively. Its purpose is to store short loader and verifier programs and keys for authentication and encryption. The address space required by Ring A is generally much smaller than that of Ring B. That is, this exemplary embodiment has the Ring A address range within the address range of Ring B, which in turn lies within the address range of Ring C. The address ranges of the rings need not be contiguous or lie in a single block. In order to prevent the access restrictions of the curtained rings from being mapped away by a processor, the address ranges of Rings A and B can be treated as physical addresses only. In one embodiment, virtual addresses are conventionally translated into their corresponding real addresses, and then the restrictions are interposed at the level of the resulting real addresses. Alternatively, a mechanism could disable virtual addressing when certain addresses are accessed.

In some cases, it may be desirable to allow multiple parties to implant their own separate authentication code and data that cannot be accessed by any of the other parties. For example, the manufacturer of the processor, the manufacturer of the computer, the provider of the operating system, and the provider of trusted application programs may all desire to execute their own authentication or other security routines and manage their own keys. At the same time, each party should be able to use code and data in the unsecure Ring C, and to execute certain routines in the inner Ring A. Dividing Ring B into peer subrings 460, 462, and 464 permits this type of operation.

Region 460, called Subring B1, has the privileges and restrictions of Ring B, except that it cannot access subring 462 or 464. Subring B1 can, however, access any part of Ring B that lies outside the other subrings. In this way, Subring 460 (B1) can function as though it were the only middle ring between Rings A and C. Subrings 462 (B2), and 464 (B3) operate in the same manner.

The memory available to the curtained memory subsystem can be allocated under the control of the Ring-A executive code. In order that no untrusted party can manipulate the memory map to reveal secrets, the map of the subrings in the Ring-B memory is kept in flash storage in curtained memory, under control of the curtained-memory controller in ring A.

The foregoing shows how untrusted code can be prevented from accessing the contents of a secure memory. The trusted code that is permitted to perform secure operations and to handle secret data is called curtained code. In other systems, such code must be executed within a privileged operating mode of the processor not accessible to non-trusted software, or from a separate secure processor. In the present invention, however, curtained code can only be executed from particular locations in memory. If this memory is made secure against intrusion, then the curtained code can be trusted by third parties. Other features restrict subversion through attempts at partial or modified execution of the curtained code.

CONCLUSION

The electronic asset system and process described above maintains the efficiency of asset sticks while flexibly allowing a user to spend coins from the same stick with multiple vendors. To maintain soundness, a randomized audit of a sampled subset of the transferred assets is implemented.

The result is a scheme where withdrawal is as efficient as the conventional PayWord system (see the Background Section). A stick can be partitioned into sub-sticks (called runs) on the fly, where each run is dedicated by the user to any vendor of the user's choice. The run's length is not pre-determined (except for the obvious restriction that the sum of runs cannot exceed the original stick). Furthermore, the deposit processing-cost of a run is roughly equal to that of a stick in PayWord.

In compliance with the patent statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A method comprising:
    minting a stick of electronic assets by digitally signing with an issuer's signature a composite of user-provided data items including a user identity, a bottom asset from a bottom of the stick, and a length of the stick;
    spending one or more assets from the stick at one or more vendors, wherein each expenditure with a particular vendor involves digitally signing with a user's signature a first asset from the stick to be spent and passing the user-signed first asset along with the issuer-signed composite to the particular vendor for verification and subsequently passing any additional assets to be spent without user signature to the particular vendor; and
    depositing one or more assets collected by the particular vendor by digitally signing with the particular vendor's signature a composite of data items including the user-signed first asset and a last asset spent by the user from the stick and passing the vendor-signed composite along with the issuer-signed composite to the issuer.

2. A method as recited in claim 1, further comprising storing the stick of electronic assets in a tamper-resistant electronic wallet.

3. A method as recited in claim 1, further comprising storing the stick of electronic assets in an electronic wallet constructed with a secure-processor architecture.

4. A method as recited in claim 1, wherein the minting comprises minting the stick of assets using a blind signature protocol.

5. A method as recited in claim 1, wherein the spending comprises:
  concatenating a vendor identity with the first asset from the stick to form a payment request;
  signing the payment request with a signature of the user:
  submitting the user-signed payment request along with the issuer-signed withdrawal request to the vendor;
  accepting the first asset as payment in an event that the user and the issuer are verified; and
  subsequently passing any additional assets from the stick as payment to the vendor without digitally signing them with the user's signature.

6. A method as recited in claim 1, further comprising auditing the assets deposited by the vendor.

7. A method as recited in claim 1, further comprising auditing a sample of the assets paid by the user to the vendor.

8. A method as recited in claim 1, further comprising selecting, at the vendor, a subset of less than all of the assets paid by the user to the vendor and submitting the subset of assets to an auditor for fraud evaluation.

9. A method comprising:
  minting a stick of electronic assets by digitally signing with an issuer's signature a composite of user-provided data items including a user identity, a bottom asset from a bottom of the stick, and a length of the stick;
  spending one or more assets from the stick at one or more vendors, wherein each expenditure with a particular vendor involves digitally signing with a user's signature a first asset from the stick to be spent and passing the user-signed first asset along with the issuer-signed composite to the particular vendor for verification and subsequently passing any additional assets to be spent without user signature to the particular vendor, and
  depositing one or more assets collected by the particular vendor by digitally signing with the particular vendor's signature a composite of data items including the user-signed first asset and a last asset spent by the user from the stick and passing the vendor-signed composite along with the issuer-signed composite to the issuer, wherein the depositing comprises:
  concatenating the user-signed first asset $S_U(Cj)$, a last asset spent from the stick Ck, and a run length RL of assets beginning with the first asset Cj and ending with the last asset Ck to form a deposit request;
  signing the deposit request with a signature of the vendor:

$S_V(S_U(Cj), Ck, RL)$ submitting the vendor-signed deposit request along with the issuer-signed withdrawal request to the issuer; and
  crediting a vendor account with the run of assets in an event that the user, the vendor, the run, and the issuer are positively verified.

10. A method for issuing electronic assets, comprising:
  forming a stick of L electronic assets $C_i$ (for i=1, ..., L) where each asset can be derived from a preceding asset in the stick;

signing the stick with a signature of a party issuing the assets;
  spending a first run of one or more assets from the stick at a first vendor; and
  spending a second run of one or more assets from the stick at a second vendor.

11. A method as recited in claim 10, further comprising storing the stick of electronic assets in a tamper-resistant electronic wallet.

12. A method as recited in claim 10, further comprising storing the stick of electronic assets in an electronic wallet constructed with a secure-processor architecture.

13. A method as recited in claim 10, wherein the forming comprises anonymously issuing the stick of assets using a blind signature protocol.

14. A method as recited in claim 10, wherein the forming comprises:
  creating the stick of L electronic assets by computing:

$C_i = h^i(x)$ (for i=1, ..., L)

where h(x) is a one-way hashing function of a value x.

15. A method for issuing electronic assets, comprising:
  forming a stick of L electronic assets $C_i$ (for i=1, ..., L) where each asset can be derived from a preceding asset in the stick; wherein the forming comprises:
  creating the stick of L electronic assets by computing:

$C_i = h^i(x)$ (for i=1, ..., L)

where h(x) is a one-way hashing function of a value x;
  constructing a withdrawal request having a user identity U, a user secret K, a last asset value $C_L$ taken from a bottom of the stick, a denomination d indicating a value for the assets in the stick, an expiration t, and the value L; and
  signing the withdrawal request with a signature of an issuer:

$S_I(U, K, d, C_L, t, L)$;

signing the stick with a signature of a party issuing the assets;
  spending a first run of one or more assets from the stick at a first vendor; and
  spending a second run of one or more assets from the stick at a second vendor.

16. A method as recited in claim 10, wherein the spending comprises:
  signing a first asset from the stick with a signature of the user:
  submitting the user-signed asset along with the signed stick to the first vendor; and
  in an event the first asset is accepted, subsequently submitting any additional assets from the stick without digitally signing them.

17. A method as recited in claim 10, further comprising auditing the assets from the first and second runs of assets for fraud.

18. A method as recited in claim 10, further comprising auditing a sample of assets from the first and second runs of assets for fraud.

19. A method as recited in claim 10, further comprising depositing the first and second runs of assets.

20. A method for issuing electronic assets, comprising:
  creating, at a user, a stick of L electronic assets by computing:

$C_i = h^i(x)$ (for i=1, ..., L)

where h(x) is a hashing function of a value x;

submitting a withdrawal request from the user to an issuer, the withdrawal request having a user identity U, a last asset value $C_L$ taken from a bottom of the stick, and the value L, while omitting any vendor identity;

signing, at the issuer, the withdrawal request; and returning the signed withdrawal request to the user.

21. A method as recited in claim 20, further comprising storing the stick of electronic assets and signed withdrawal request in a tamper-resistant electronic wallet.

22. A method as recited in claim 20, further comprising storing the stick of electronic assets and signed withdrawal request in an electronic wallet constructed with a secure-processor architecture.

23. (Original); A method as recited in claim 20, wherein the withdrawal request further has a user secret K, a denomination d indicating a value for the assets in the stick, and an expiration t.

24. A method comprising;

creating, at a user, a stick of L electronic assets by computing:

$$C_i = h^i(x) \text{ (for } i=1, \ldots, L)$$

where h(x) is a hashing function of a value x;

submitting a withdrawal request from the user to an issuer, the withdrawal request having a user identity U, a user secret K, a last asset value $C_L$ taken from a bottom of the stick, a denomination d indicating a value for the assets in the stick, an expiration t, and the value L;

signing, at the issuer, the withdrawal request:

$$S_I(U, K, d, C_L, t, L)$$

returning the issuer-signed withdrawal request to the user;

initiating payment of one or more assets from the stick to a vendor having an identity V;

concatenating, at the user, the vendor identity with a first asset Cj to be spent from the stick to form a payment request, and a depth D indicating a distance of the first asset from the bottom of the stick;

signing the payment request with a signature of the user:

$$S_U(Cj, D, V1)$$

submitting the user-signed payment request along with the issuer-signed withdrawal request to the vendor, accepting the first asset as payment at the vendor in an event that the user and the issuer are verified;

subsequently passing any additional assets from the stick as payment to the vendor without digitally signing them with the user's signature;

concatenating, at the vendor, the user-signed first asset, a last asset spent from the stick Ck, and a run length RL of assets beginning with the first asset Cj and ending with the last asset Ck to form a deposit request;

signing the deposit request with a signature of the vendor.

$$S_V(S_U(Cj), Ck, RL)$$

submitting the vendor-signed deposit request along with the issuer-signed withdrawal request to the issuer; and crediting a vendor account with the run of assets in an event that the user, the vendor, and the issuer are verified.

25. A method as recited in claim 24, further comprising randomly selecting an asset from the assets paid by the user to the vendor and submitting the selected asset for audit.

26. A method as recited in claim 24, further comprising auditing the assets deposited by the vendor with the issuer.

27. A method for anonymously issuing electronic assets, comprising:

creating, at a user, a stick of L electronic assets by computing:

$$C_i = h^i(x) \text{ (for } i=1, \ldots, L)$$

where h(x) is a hashing function of a value x;

blinding the stick using a random value p, where:

$$\text{Blind Stick} = p^e C_L \bmod N$$

where $C_L$ is a bottom asset on the stick;

submitting a withdrawal request from the user to an issuer, the withdrawal request having the blind stick and the value L;

signing, at the issuer, the withdrawal request by computing:

$$c = (p^e C_L)^{Lf} = p^L C_L^{Lf} \bmod N$$

where e and f are public and private variables known by the issuer and e is known to everyone;

returning the signed withdrawal request to the user;

deriving a new bottom asset by computing:

$$C_L^{Lf} = c/p^L \bmod N.$$

28. A method as recited in claim 27, further comprising storing the blind stick of electronic assets and signed withdrawal request in a tamper-resistant electronic wallet.

29. A method as recited in claim 27, further comprising verifying the bottom asset by computing $C_L^{Lf}$ independently and comparing a result to the new bottom asset derived in said deriving($C_L^{Lf}$).

30. A method as recited in claim 27, further comprising storing the blind stick of electronic assets and signed withdrawal request in an electronic wallet constructed with a secure-processor architecture.

31. A method as recited in claim 27, further comprising spending an asset from the blind stick by first sending the new bottom to a vendor for verification.

32. An electronic asset system comprising:

an issuer wallet having a processor and storage, the issuer wallet digitally signing with an issuer's signature a composite of user-provided data items including a user identity, a bottom asset from a bottom of a stick of electronic assets, and a length of the stick;

a user wallet having a processor and storage to store the stick of electronic assets and issuer-signed composite and to spend one or more assets from the stick at one or more vendors, the user wallet spending one or more assets by digitally signing with a user's signature a first asset from the stick to be spent and passing the user-signed first asset along with the issuer-signed composite to the vendor for verification; whereupon verification, the user wallet subsequently passes any additional assets to be spent without user signature to the vendor; and a vendor wallet having a processor and storage to store one or more assets spent by the user wallet, the vendor wallet depositing the assets collected from the user wallet by digitally signing with the particular vendor's signature a composite of data items including the user-signed first asset and a last asset passed in the stick received from the user wallet and passing the vendor-signed composite along with the issuer-signed composite to the issuer wallet for verification.

33. An electronic asset system as recited in claim 32, wherein the issuer wallet, the user wallet, and the vendor wallet are tamper-resistant.

34. An electronic asset system as recited in claim 32, wherein the issuer wallet, the user wallet, and the vendor wallet are tamper-resistant constructed with a secure-processor architecture.

35. An electronic asset system as recited in claim 32, wherein the issuer wallet signs the composite using a blind signature protocol.

36. An electronic asset system as recited in claim 32, further comprising an auditing system to audit the electronic assets to detect whether assets have been used in a fraudulent manner.

37. An electronic asset system as recited in claim 32, further comprising a probabilistic auditing system to sample a subset of less than all electronic assets to detect whether assets have been used in a fraudulent manner.

38. An electronic wallet having memory and a processor, the electronic wallet being programmed to:
create a stick of L electronic assets by computing;

$$C_i = h^i(x) \text{ (for } i=1, \ldots, L)$$

where h(x) is a hashing function of a value x;
form a withdrawal request having a user identity U, a last asset value $C_L$ taken from a bottom of the stick, and the value L, while omitting any vendor identity;
submit withdrawal request to an issuer and receive the withdrawal request back with an issuer signature; and
store the signed withdrawal request and the stick.

39. An electronic wallet having memory and a processor, the electronic wallet being programmed to:
create a stick of L electronic assets by computing:

$$C_i = h^i(x) \text{ (for } i=1, \ldots, L)$$

where h(x) is a hashing function of a value x;
form a withdrawal request having a user identity U, a last asset value $C_L$ taken from a bottom of the stick, and the value L, while omitting any vendor identity;
submit withdrawal request to an issuer and receive the withdrawal request back with an issuer signature;
store the signed withdrawal request and the stick;
form a payment request for payment of one or more assets from the stick to a vendor having an identity V, the payment request having the vendor identity V and a first asset Cj to be spent from the stick;
sign the payment request:

$$S_U(Cj, V1); \text{ and}$$

submit the signed payment request along with the signed withdrawal request to the vendor.

* * * * *

UNITED STATES PATENT AND TRADEMARK OFFICE
CERTIFICATE OF CORRECTION

| | | |
|---|---|---|
| PATENT NO. | : 7,020,638 B1 | Page 1 of 1 |
| APPLICATION NO. | : 09/451254 | |
| DATED | : March 28, 2006 | |
| INVENTOR(S) | : Yacobi et al. | |

It is certified that error appears in the above-identified patent and that said Letters Patent is hereby corrected as shown below:

On the Title page, in field (56), under "Foreign Patent Documents", in column 2, line 3, after "11/2000" insert -- G06F 17/00 --.

In column 4, line 4, delete "$_V(S_U(Cj), Ck, RL)$" and insert -- $S_V(S_U(Cj), Ck, RL)$ --, therefor.

In column 8, line 28, after "coin" delete "9".

In column 11, line 57, delete "( )," and insert -- h( ), --, therefor.

In column 13, line 35, delete "in" before "interest".

In column 13, line 38, delete "e.g." and insert -- e.g., --, therefor.

In column 13, line 56, delete ""$C_{next}$" and insert -- "$C_{next}$" --, therefor.

In column 13, line 65, after "coupon" delete ".".

In column 15, line 41, delete "Analysis.(DPA)." and insert -- Analysis (DPA). --, therefor.

In column 16, line 33, delete "$K_{CPU}^{-1}$";" and insert -- $K_{CPU}^{-1}$; --, therefor.

In column 21, line 44, in Claim 9, delete "vendor," and insert -- vendor; --, therefor.

In column 23, line 15, in Claim 23, delete "(Original);" before "A method".

In column 23, line 44, in Claim 24, delete "vendor," and insert -- vendor; --, therefor.

In column 23, line 55, in Claim 24, delete "vendor." and insert -- vendor: --, therefor.

In column 25, line 17, in Claim 38, delete "computing;" and insert -- computing: --, therefor.

Signed and Sealed this

Twentieth Day of April, 2010

David J. Kappos
*Director of the United States Patent and Trademark Office*